Dec. 7, 1965      R. M. MEADE      3,222,506
VARIABLE RADIX ADDER AND SUBTRACTOR
Filed Nov. 16, 1961      12 Sheets-Sheet 1
FIG. 1      LOGIC UNIT
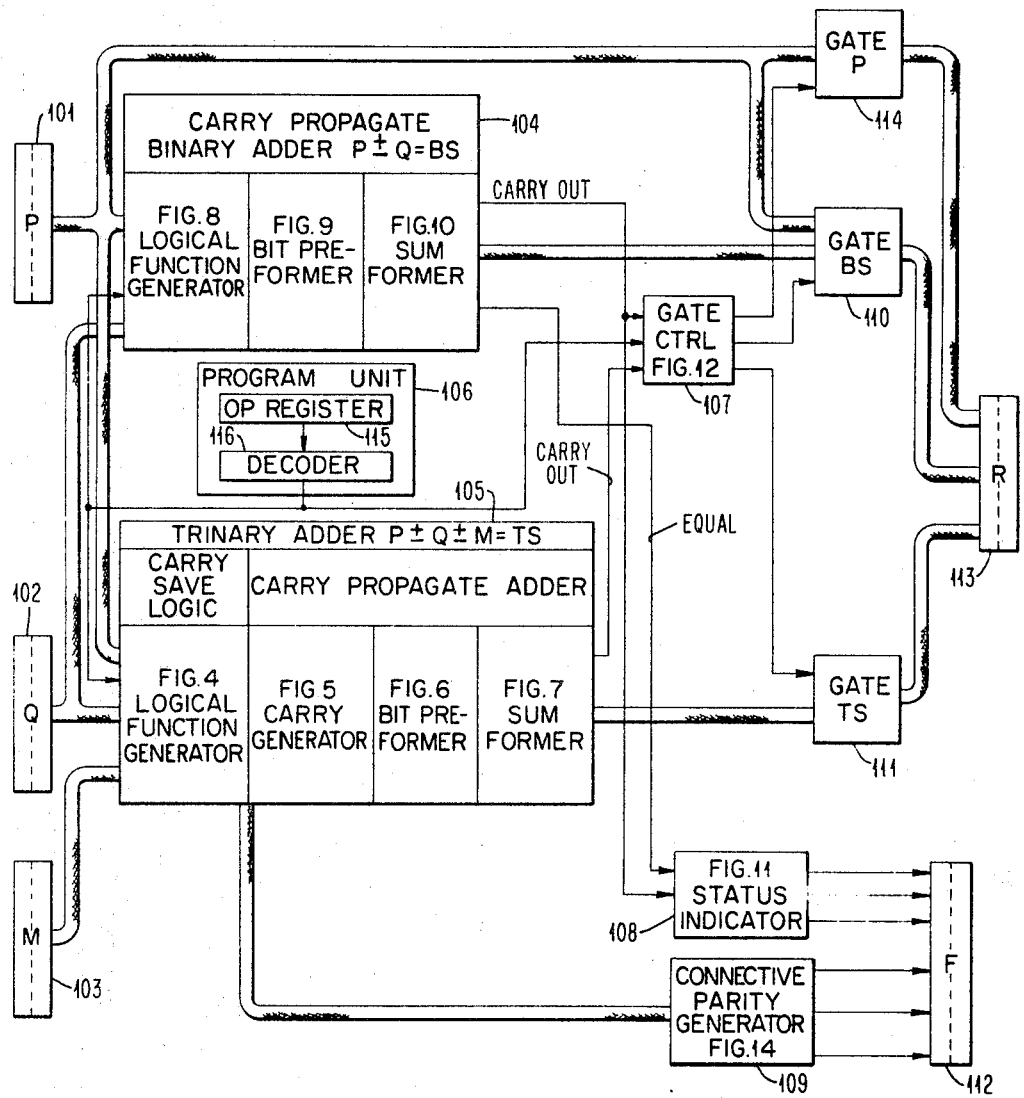
FIG. 2
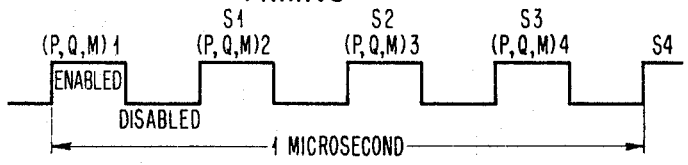
INVENTOR
ROBERT M. MEADE
BY Carl C. Kling
ATTORNEY

FIG.3     OPERATIONS & GATING

| CLASS | OP | GATE IN P | GATE IN Q | M | OPERATION PERFORMED | CARRY OUT TRI | CARRY OUT BIN | CARRY OUT IND | NO CARRY OUT TRI | NO CARRY OUT BIN | NO CARRY OUT IND | GATE OUT FUNCTION | GATE OUT 4-BITS-8 | VALIDITY |
|---|---|---|---|---|---|---|---|---|---|---|---|---|---|---|
| I | 16 | TRUE P | COMPLEMENT Q | | MAX(P,Q) | | ✓ | P≥Q | | | P<Q | P | P DIRECT | |
| I | 17 | TRUE P | COMPLEMENT Q | | MIN (P,Q) | | | | | ✓ | P<Q | Q | TRINARY | |
| I | | | | | | | ✓ | P≥Q | | | | Q | TRINARY | |
| I | | | | | | | | | | ✓ | P<Q | P | P DIRECT | |
| I | 24 | TRUE P | COMPLEMENT Q | | (P≥Q→P-Q)(P<Q→O'S) | | ✓ | P≥Q | | | | P-Q | BINARY | |
| I | | | | | | | | | | ✓ | P<Q | O'S | NO GATE | |
| I | 25 | TRUE P | COMPLEMENT Q | | (P≥Q→P-Q)(P<Q→NO BYTE) | | ✓ | P≥Q | | | | P-Q | BINARY | |
| I | | | | | | | | | | ✓ | P<Q | — | NO GATE | NO |
| I | 26 | COMPLEMENT P | TRUE Q | | (Q≥P→Q-P)(Q<P→O'S) | | ✓ | | | | P>Q | O'S | NO GATE | |
| II | | | | | | | ✓ | P≤Q | | | | Q-P | BINARY | |
| II | 27 | COMPLEMENT P | TRUE Q | | (Q≥P→Q-P)(Q<P→NO BYTE) | | ✓ | | | | P>Q | — | NO GATE | NO |
| I | | | | | | | ✓ | P≤Q | | | | Q-P | BINARY | |
| I | 28 | TM | TRUE P | COMPLEMENT Q | | P-Q / MODULO M/ | | ✓ | | | ✓ | P<Q | P-Q / BASE M/ | BINARY | |
| II | | | | | | | | P≤Q | | | | | TRINARY | |
| II | 29 | TM | COMPLEMENT P | TRUE Q | | Q-P / MODULO M/ | | ✓ | Q≥P | | | Q<P | Q-P / BASE M/ | BINARY | |
| | | | | | | | | | | | | | TRINARY | |
| | 30 | ALL 1'S | TRUE P | TRUE Q | | P+Q / BINARY / | ✓ | | — | NOT USED | | | P+Q/BINARY/ | TRINARY | |
| | 31 | CM | TRUE P | TRUE Q | | P+Q / MODULO M/ | ✓ | | P+Q≥M | | ✓ | P+Q<M | P+Q/BASE M/ | TRINARY | |
| | | | | | | | | | | | | | BINARY | |
| | | | | | | 1/2 SUMS=ALL 1'S | 1/2 SUMS≠ALL 1'S | | | | | | | |
| | | | | | | BIN | IND | | BIN | IND | | | | |
| I | 18 | TRUE P | COMPLEMENT Q | | (P=Q→P)(P≠Q→O'S) | ✓ | P=Q | | ✓ | P≠Q | | P | P DIRECT | |
| I | 19 | TRUE P | COMPLEMENT Q | | (P=Q→P)(P≠Q→NO BYTE) | ✓ | P=Q | | | | P≠Q | O'S | NO GATE | |
| I | 20 | TRUE P | COMPLEMENT Q | | (P≠Q→P)(P=Q→O'S) | | | | ✓ | P≠Q | | P | P DIRECT | NO |
| I | 21 | TRUE P | COMPLEMENT Q | | (P≠Q→P)(P=Q→NO BYTE) | ✓ | P=Q | | | | | — | NO GATE | |
| I | | | | | | | | | ✓ | P≠Q | | P | P DIRECT | |
| I | 22 | TRUE P | COMPLEMENT Q | | (P≠Q→Q)(P=Q→O'S) | ✓ | P=Q | | | | | O'S | NO GATE | NO |
| I | | | | | | | | | ✓ | P≠Q | | Q | TRINARY | |
| I | 23 | TRUE P | COMPLEMENT Q | | (P≠Q→Q)(P=Q→NO BYTE) | ✓ | P=Q | | | | | O'S | NO GATE | |
| I | | | | | | | | | ✓ | P≠Q | | — | NO GATE | NO |

FIG. 4 TRINARY ADDER LOGICAL FUNCTION GENERATOR
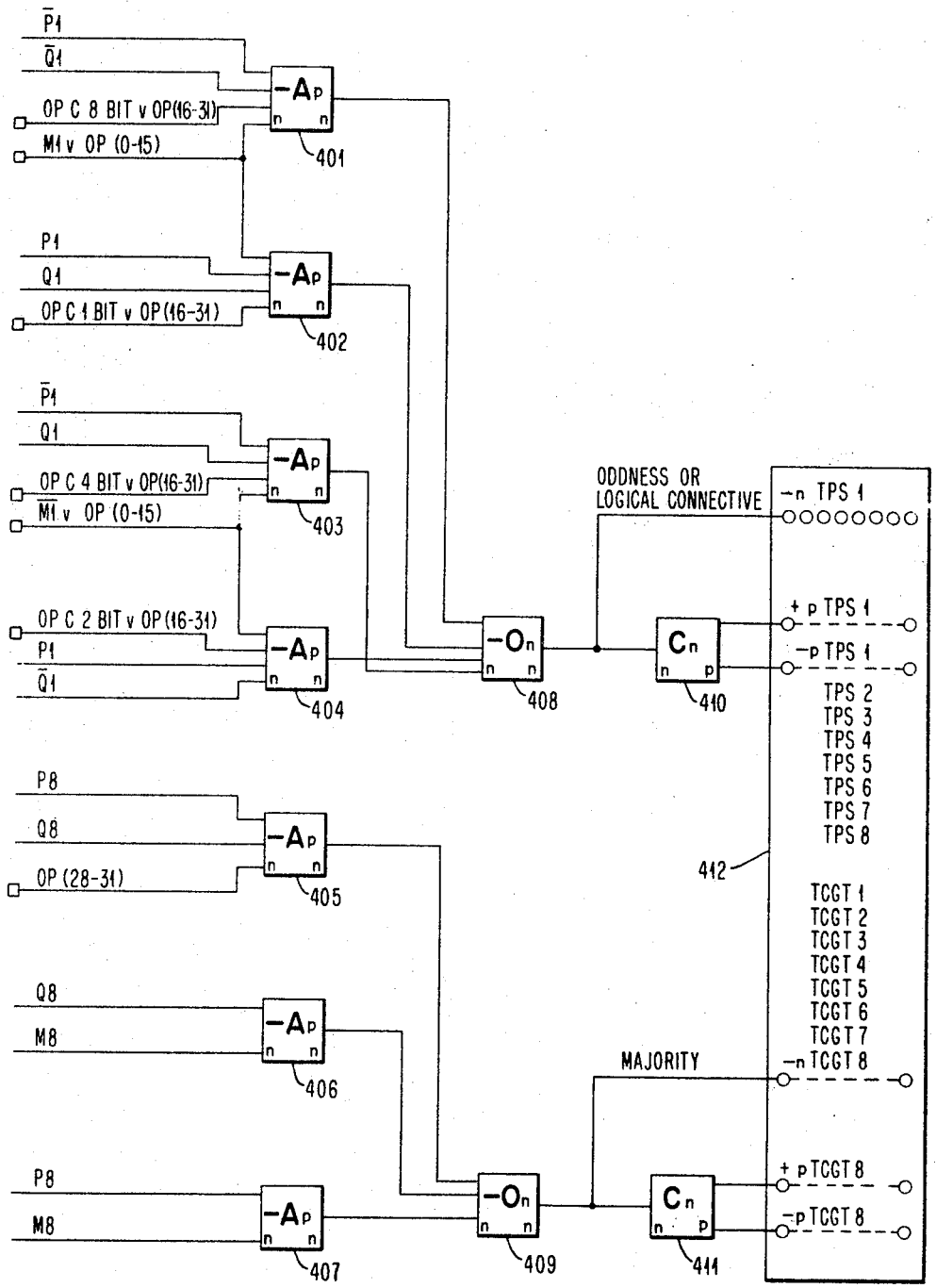

FIG. 5　TRINARY ADDER CARRY GENERATOR
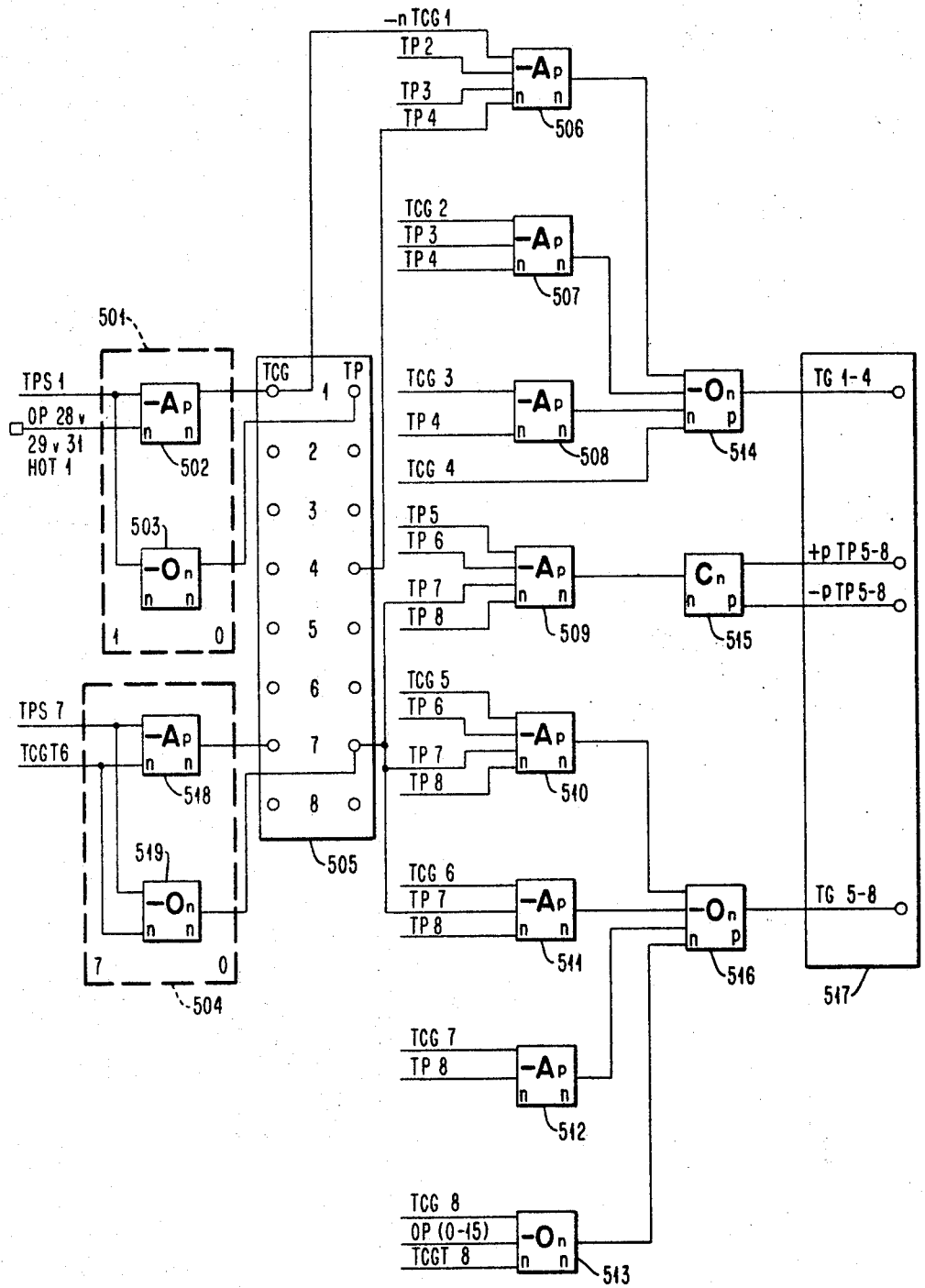

FIG. 6 TRINARY ADDER BIT PREFORMER
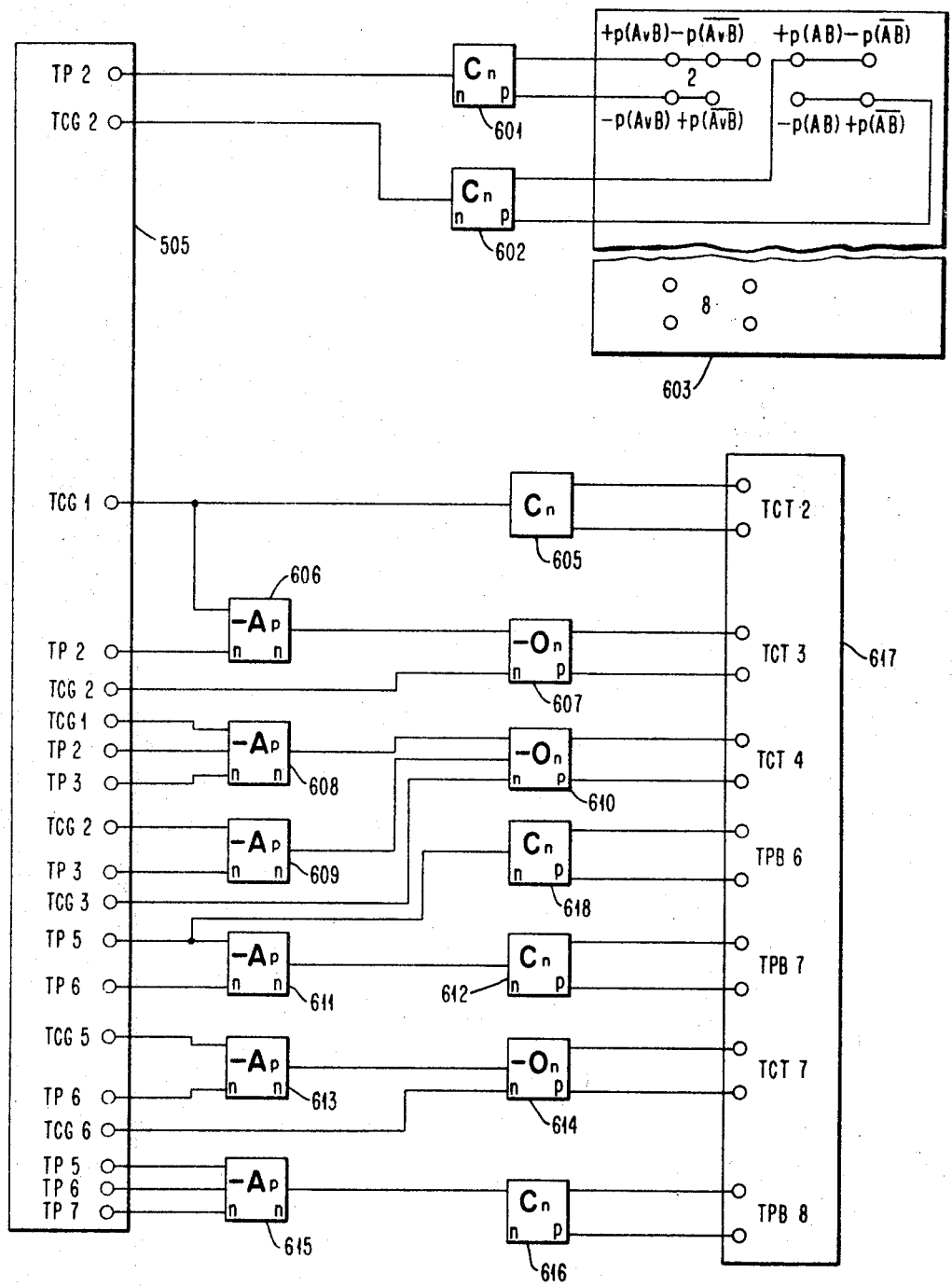

Dec. 7, 1965  R. M. MEADE  3,222,506
VARIABLE RADIX ADDER AND SUBTRACTOR
Filed Nov. 16, 1961  12 Sheets-Sheet 6
FIG. 7  TRINARY ADDER SUM FORMER
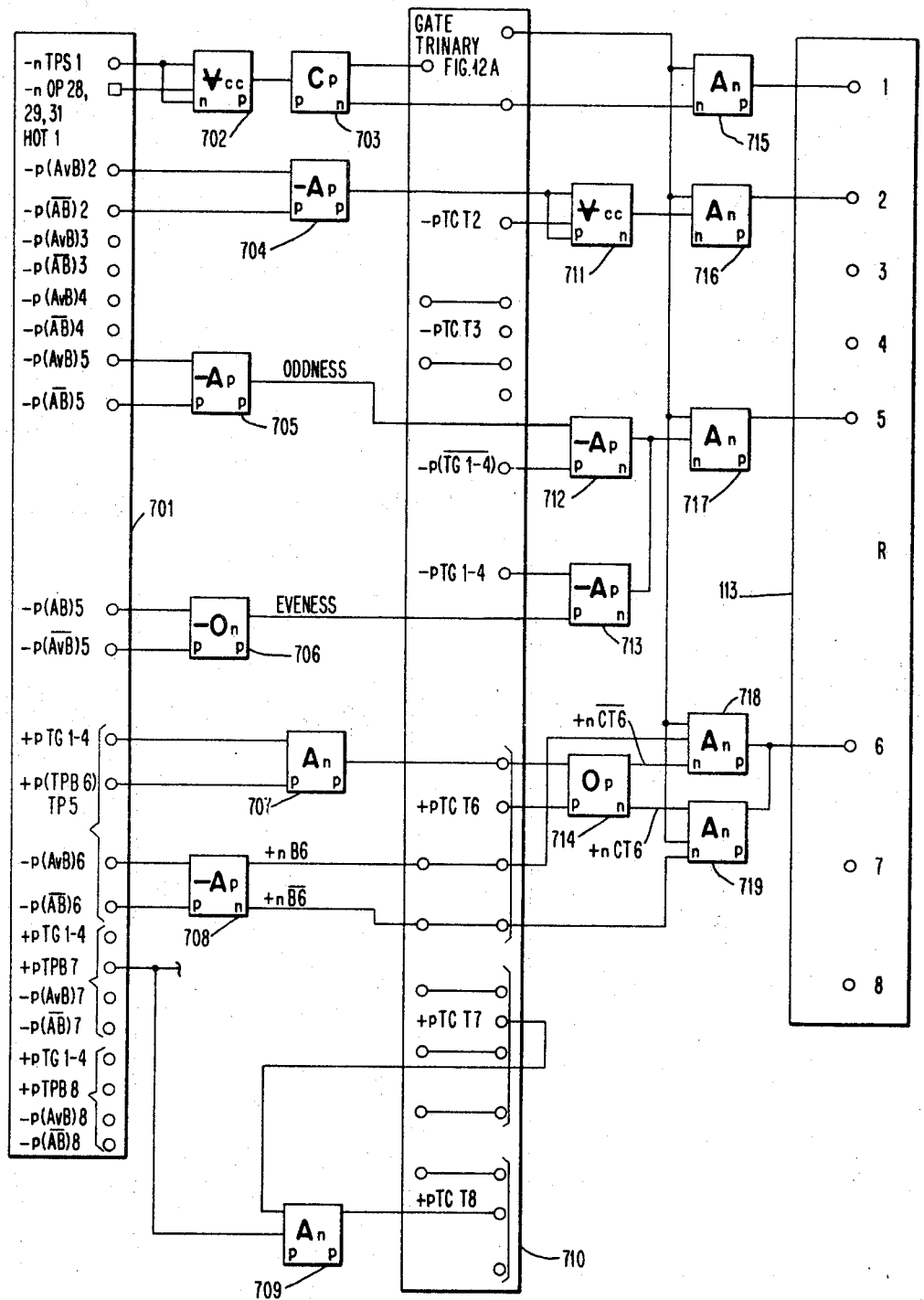

FIG. 8  BINARY ADDER LOGICAL FUNCTION GENERATOR
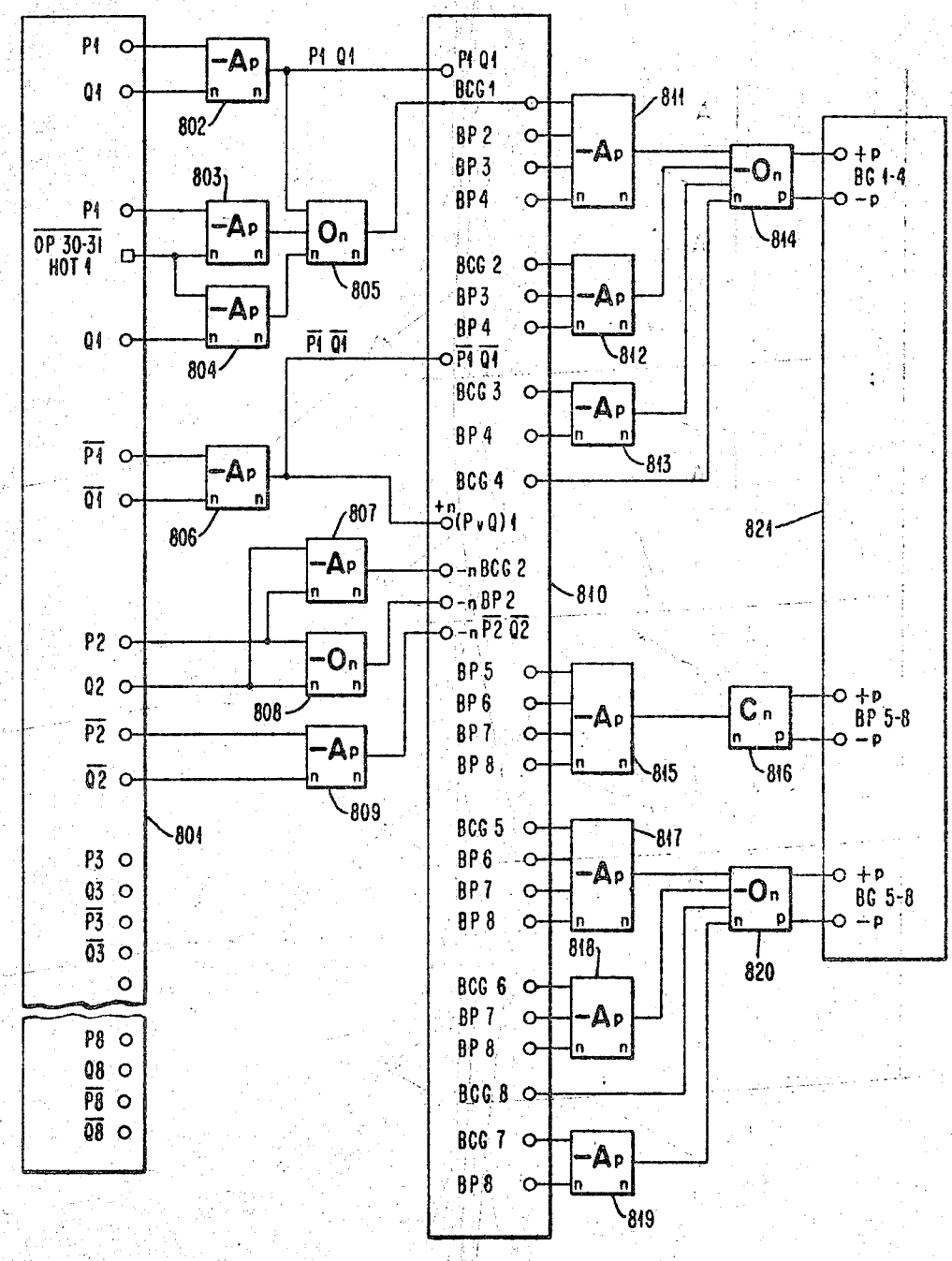

Dec. 7, 1965   R. M. MEADE   3,222,506
VARIABLE RADIX ADDER AND SUBTRACTOR
Filed Nov. 16, 1961   12 Sheets-Sheet 8
FIG.9   BINARY ADDER BIT PREFORMER
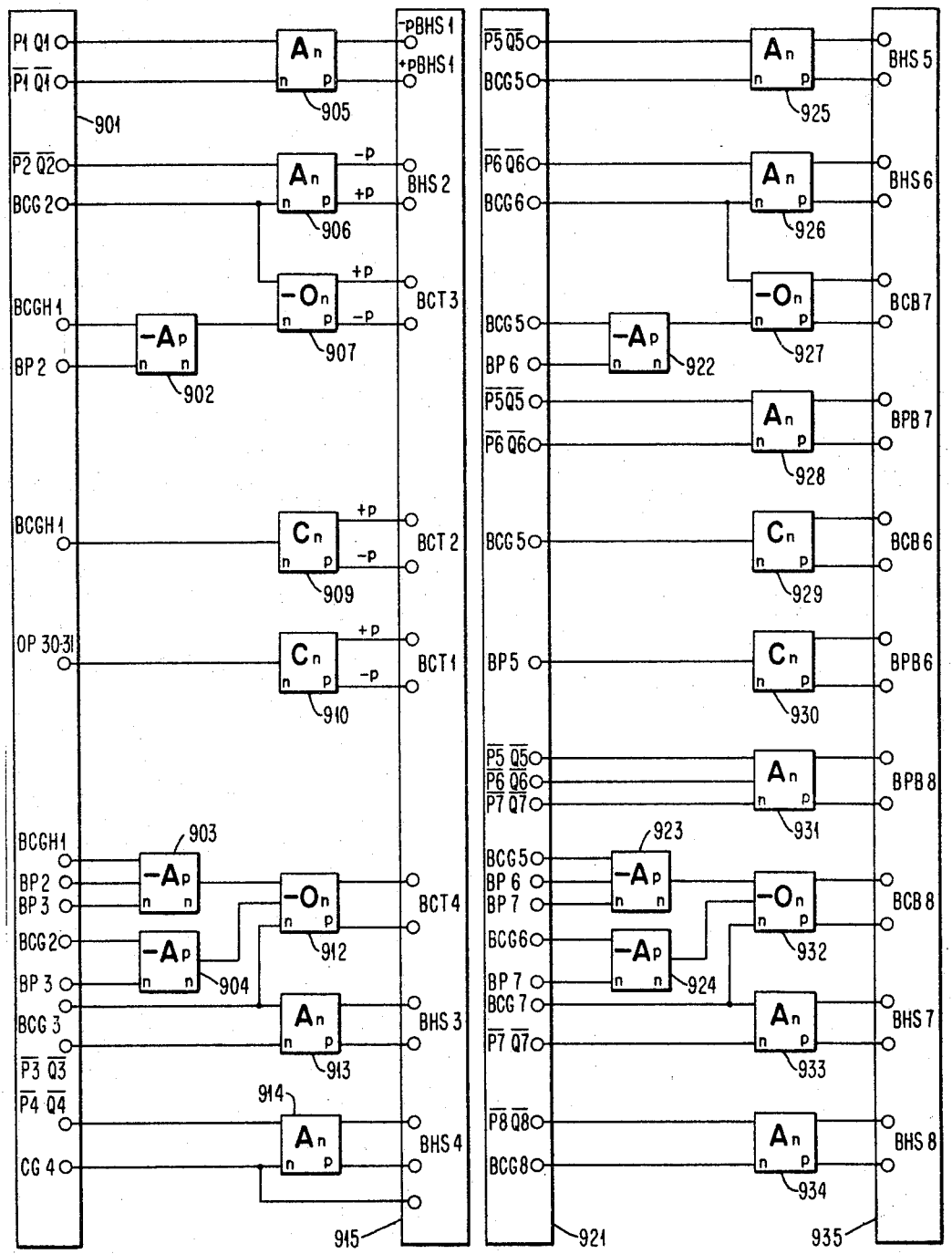

Dec. 7, 1965 R. M. MEADE 3,222,506
VARIABLE RADIX ADDER AND SUBTRACTOR
Filed Nov. 16, 1961 12 Sheets-Sheet 9
FIG. 10 BINARY ADDER SUM FORMER
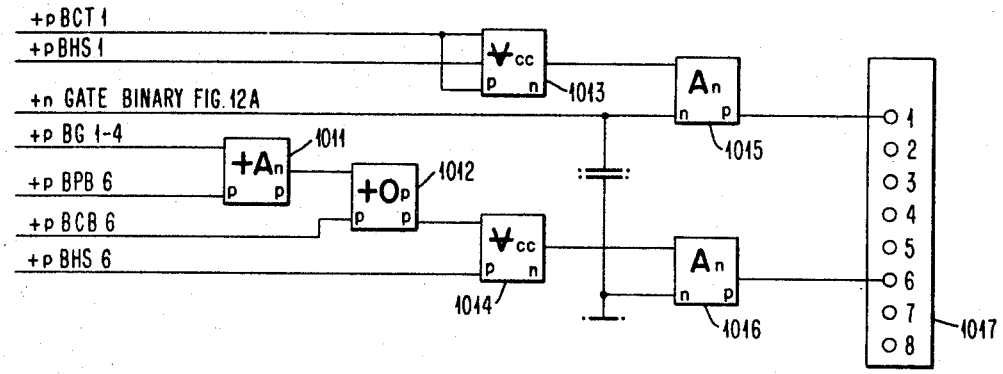
FIG. 11 STATUS INDICATOR
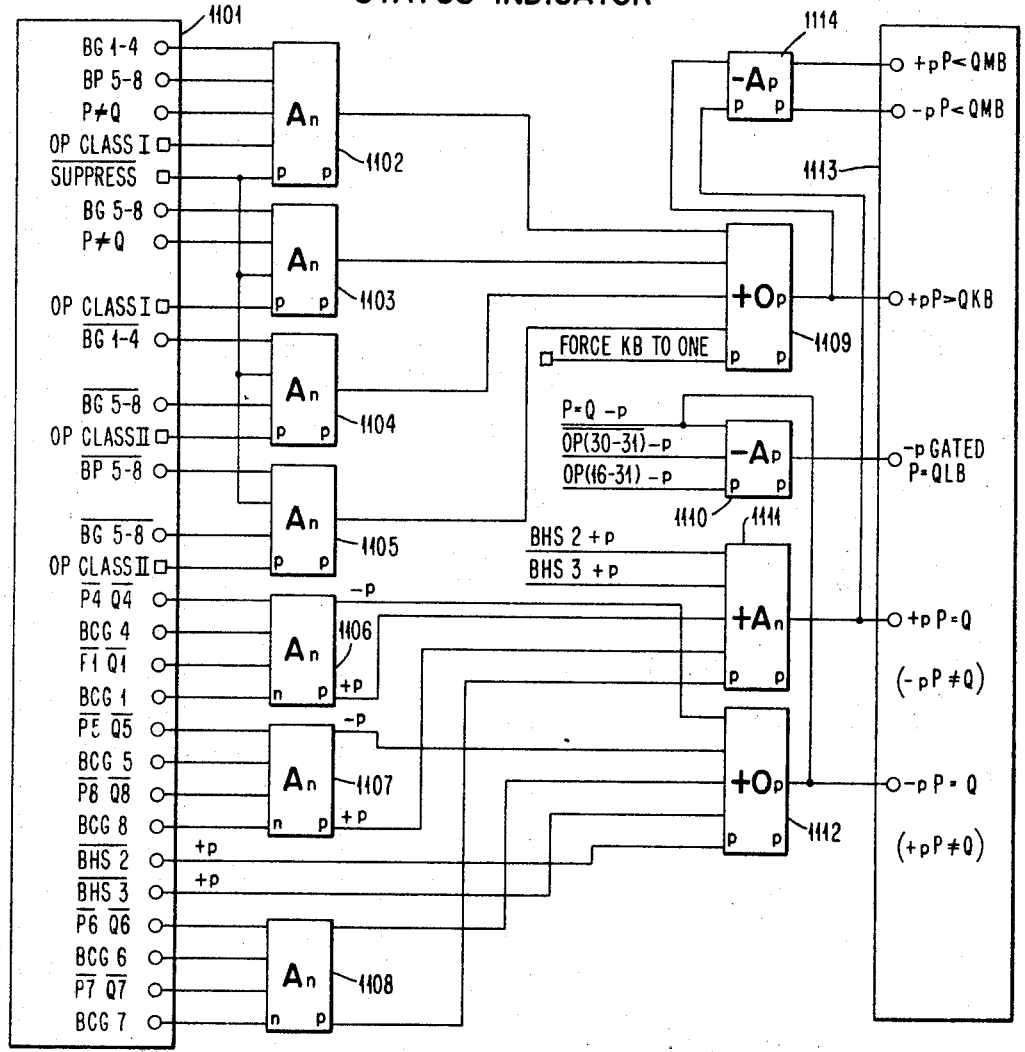

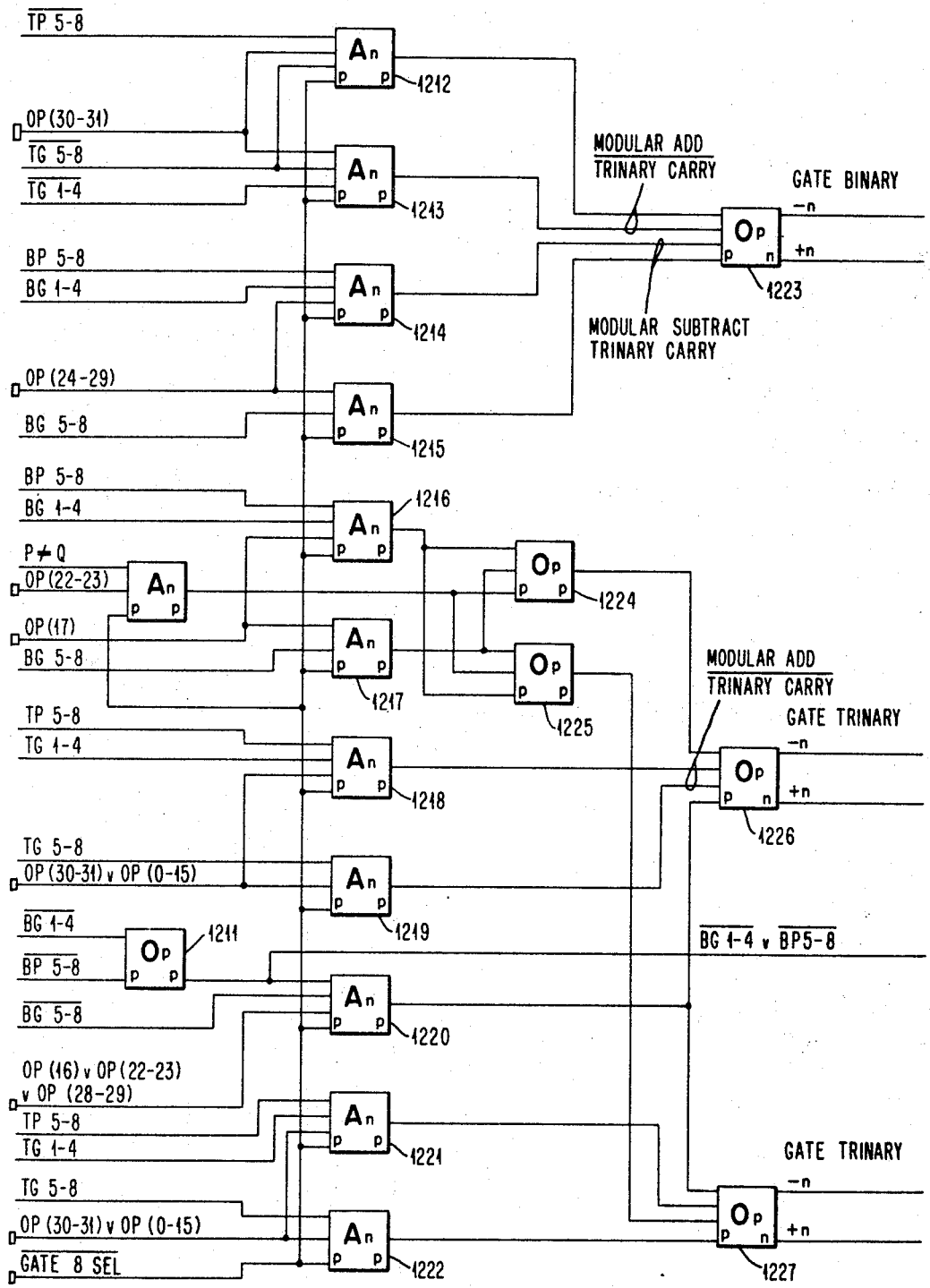
FIG. 12A  GATE CONTROL

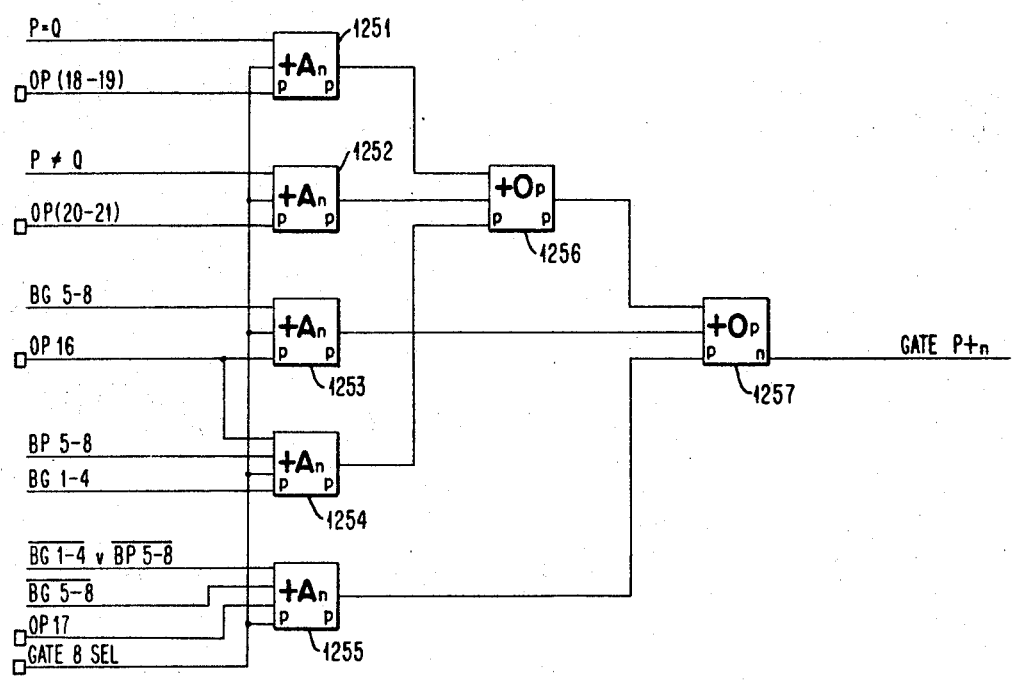
FIG.12B  GATE CONTROL
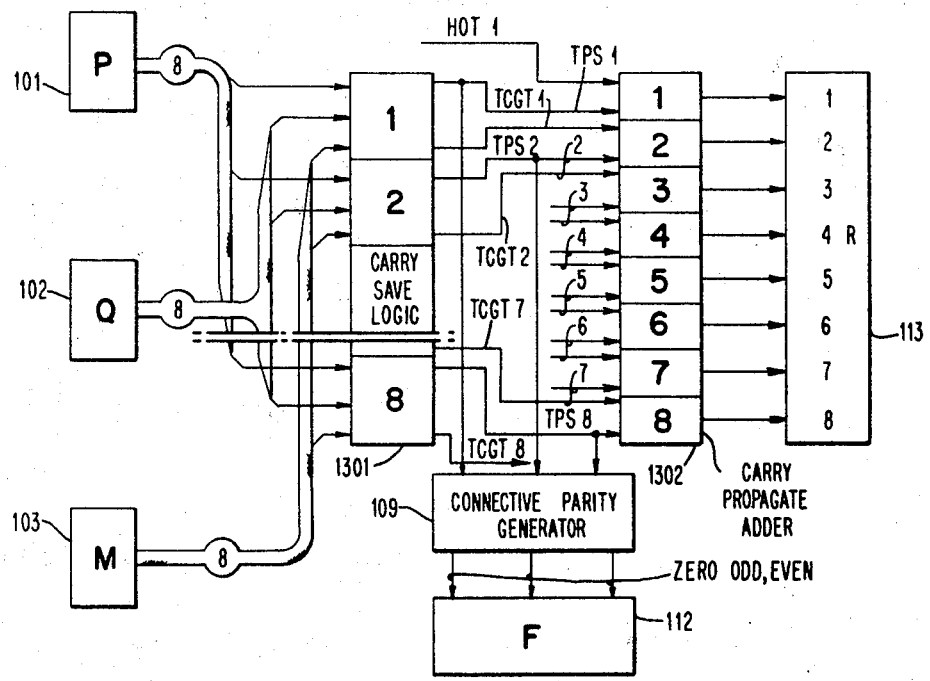
FIG.13  TRINARY ADDER

Dec. 7, 1965     R. M. MEADE     3,222,506
VARIABLE RADIX ADDER AND SUBTRACTOR
Filed Nov. 16, 1961     12 Sheets-Sheet 12
FIG. 14     CONNECTIVE PARITY GENERATOR
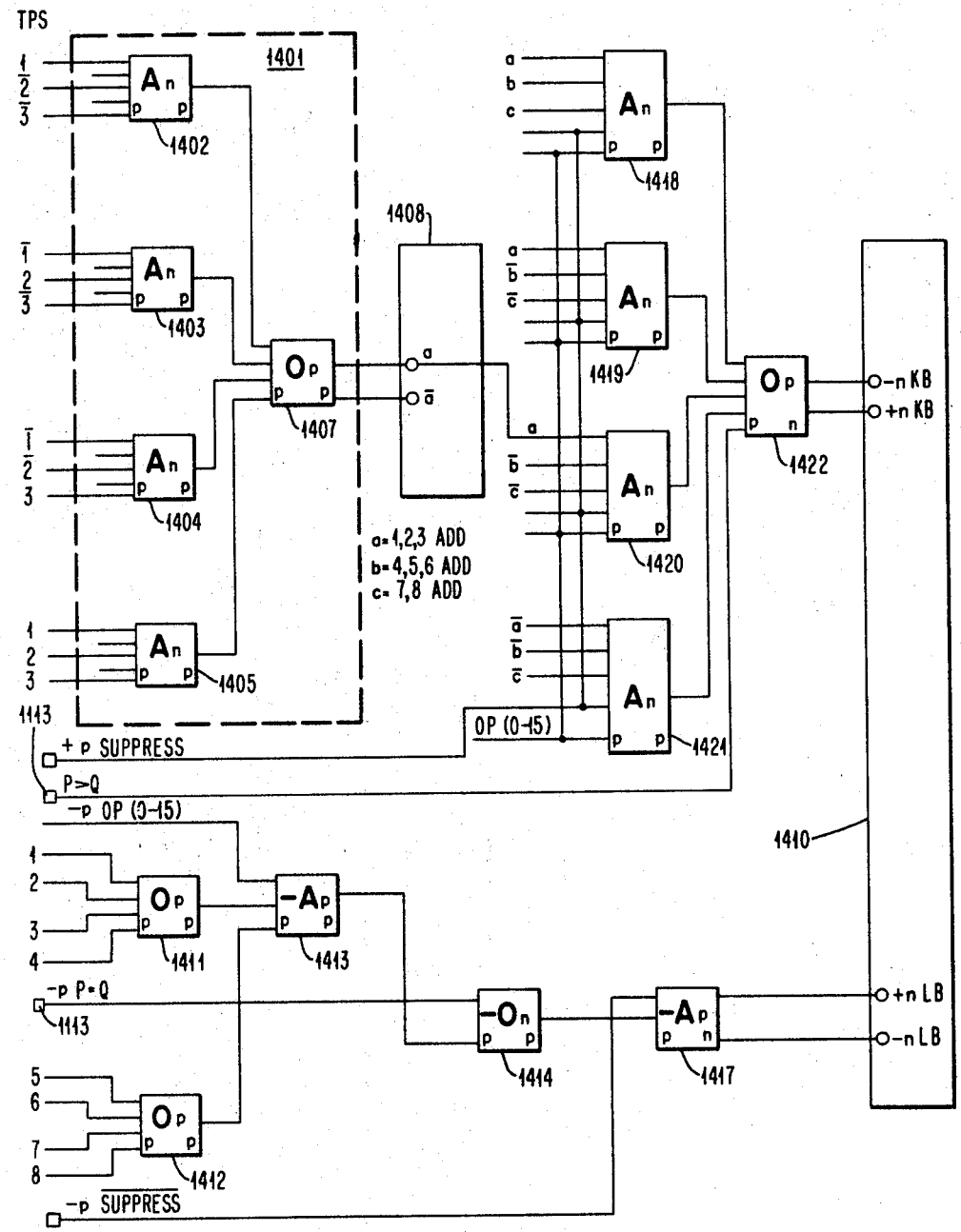

United States Patent Office 3,222,506
Patented Dec. 7, 1965

3,222,506
VARIABLE RADIX ADDER AND SUBTRACTOR
Robert M. Meade, Wassaic, N.Y., assignor to International Business Machines Corporation, New York, N.Y., a corporation of New York
Filed Nov. 16, 1961, Ser. No. 152,831
10 Claims. (Cl. 235—169)

This invention relates to digital computers, and more particularly to a logic unit which can perform the logical operation of generating selective logical connectives on a bit-by-bit basis as well as the logical operation of variable radix addition with parallel carry handling.

The logic unit accepts inputs from three sources designated P, Q and M. Generally, P is the addend, Q is the augend and M is the correction factor or modulus.

The logic unit has two basic modes of operation, "add" and "connect" which in the preferred embodiment are selected by microprogramming techniques. In add mode, the logic unit performs true variable-radix addition of two binary operands P and Q according to a radix or modulus M. In add mode, the modulus is a radix correction factor. In connect mode the logic unit performs bit-by-bit logical connective operations upon operands P and Q in response to control signals which specify the connective. In connect mode the modulus is forcibly set to a predetermined value which facilitates the logical connective operation. In add mode the control signals are forced to a specific value while the modulus is treated as a third variable.

The logic unit includes two separate binary arithmetic means. The first is a two input device for performing binary arithmetic operations upon two binary operands P and Q. This first device will be hereinafter referred to as a "binary adder." The second arithmetic device has three inputs and performs arithmetic operations upon three binary operands P, Q and M. To distinguish the second arithmetic device from the first it will be hereinafter referred to as a "trinary adder." The mathematics of most radix correction situations require selective addition of the modulus. This selection is performed in the logic unit during variable radix addition by selectively gating the output from the binary adder (sum<radix) or from the trinary adder (sum≥radix). Other operations follow gating rules indicated by binary and trinary adder carries and by the operation codes.

For example, it may be desirable to add binary-coded-decimal operands in a full-binary four-bit adder and convert the sum to binary coded decimal by the addition of the value six to sums which surpass nine [for example, 5(0101)+7(0111)=12(1100) in binary]. Subtraction of the modulus 10(1010), by adding the 2's complement 0110(6) in response to the "over 9" situation produces 2(0010); the high order 1 (fourth order carry) is ignored and the result is the desired binary-coded-decimal sum digit 2.

To add in four-bit dozens, modulus 12(1100) is subtracted from sums "over 11"; other radices are similarly available.

PRIOR ART BACKGROUND

Digital computers generally operate on data which is coded in binary fashion. The smallest item of information is a bit. Each bit can be either electrically present or absent, or in the usual parlance, 1 value or 0 value. A small number of bits which are generally handled together are termed a "byte." A byte in the preferred embodiment includes eight bits of data and a parity bit. One or more bytes can be combined to form a field, which is the basic information grouping for most communications situations within the computer.

Since the majority of the basic switching elements within the computer are two-state binary elements, internal operation is generally subject to a binary form of description called Boolean algebra. Boolean algebra operates on the basis of two values, 1 and 0. If bit sources are designated P and Q, the 1 values are respectively (P) and (Q), and the 0 values are respectively $\bar{P}$ ("not P") and $\bar{Q}$ ("not Q"). The P and Q values can be combined by logical AND [$P \cdot Q$, (P)(Q)] or by logical OR (PvQ) in eight fashions as follows:

$\bar{P}v\bar{Q}$   $\overline{PQ}$
$Pv\bar{Q}$   $P\bar{Q}$
$\bar{P}vQ$   $\bar{P}Q$
$PvQ$   $PQ$ P and Q can also be combined by other logical connectives such as $\veebar$ (EXCLUSIVE OR), ≡ (identity), arbitrary 1 or 0 settings and (don't care) settings where either P or Q is ignored.

Boolean algebra is explained in detail in such texts as Richards, Arithmetic Operations in Digital Computers, Van Nostrand, 1955.

In any byte and in any field, each bit order provides the bit with a particular distinct value or indication. These bit values differ with various radices of coding and with various logical uses of a word. For example, an eight-bit byte in binary code indicates zero by all 0's and a value range from ($2^0$) to ($2^8-1$) by a pattern of 1 bits; that is 0 to 255. Bits are weighted 128, 64, 32, 16, 8, 4, 2, 1. Value is determined by summation of weights; i.e. an 8 bit plus a 2 bit equals 10.

In binary coded decimal, where each four-bit half-byte indicates a decimal digit, the eight-bit byte indicates decimal values 00–99. In arithmetic of radix twelve, where a four-bit half-byte indicates values 0–11, the eight-bit byte indicates decimal values 0–143.

There are certain computer applications where it is desirable to operate in a non-standard radix; for example, radix 88 might be of interest in musical analysis of a piano score. Especially in operations involving such a non-standard radix, computer operation is likely to involve a need for logical operation on a bit-by-bit basis as well as arithmetic operations.

Two bytes P and Q can be logically combined in many fashions. Among these fashions are carry-producing connectives (addition-subtraction) and various bit-by-bit logical connectives such as $P\bar{Q}$, PQ, PvQ, $P\veebar Q$, etc. For two bits, there are sixteen possible bit-by-bit logical connectives, which can be numbered 0–15. These connectives, and the result of applying them to two examples $P=1111$ and $Q=0110$ (Result A) and to $P=0011$ and $Q=0101$ (Result B) are shown in the chart below:

| Connective | Number | Result A | Result B |
|---|---|---|---|
| All Zeros (don't care) | 0 | 0000 | 0000 |
| PQ | 1 | 0110 | 0001 |
| P$\bar{Q}$ | 2 | 1001 | 0010 |
| P (don't care Q) | 3 | 1111 | 0011 |
| $\bar{P}$Q | 4 | 0000 | 0100 |
| Q (don't care P) | 5 | 0110 | 0101 |
| P∀Q (EXCLUSIVE OR) | 6 | 1001 | 0110 |
| PvQ | 7 | 1111 | 0111 |
| $\overline{PQ}$ | 8 | 0000 | 1000 |
| P≡Q (Identity) | 9 | 0110 | 1001 |
| $\bar{Q}$ (don't care P) | 10 | 1001 | 1010 |
| Pv$\bar{Q}$ | 11 | 1111 | 1011 |
| $\bar{P}$ (don't care Q) | 12 | 0000 | 1100 |
| $\bar{P}$vQ | 13 | 0110 | 1101 |
| $\bar{P}$v$\bar{Q}$ | 14 | 1001 | 1110 |
| All Ones (don't care) | 15 | 1111 | 1111 |

Prior art has shown various methods of logically combining two data groups. Among these mechanisms are various forms of adders. The basic categories of the adder art are serial and parallel adders, characterized by the serial or parallel presentment of various order bits to the mechanism for combining them. In a serial adder, for example, the low order bit of the addend and the low order bit of the augend are presented together, combined by the adder to produce a sum and a carry, and the sum and carry are processed on to a storage medium. The next higher order bit of the addend and the next higher order bit of the augend are then presented to the adder along with the carry from the low order, producing a sum and carry. For each order, the sum is stored and the carry is retained for use in forming the sum of the next higher order bits.

In the parallel adder, the entire augend and the entire addend are presented to the adder simultaneously, that is, in parallel. The addend low order bit and the augend low order bit are logically combined to produce a sum and carry; at the same time all other order bits of the addend and the respectively corresponding bits of the augend are presented to the adder and logically combined to produce respective bit order sums and carries.

The carries, however, become a problem since the lower order carries can affect both the higher order sums and the higher order carries. In any particular order, a carry can be generated when the addition sum exceeds the radix or a carry can be propagated when the addition sum is equal to the radix and a lower order carry is presented. Various methods of carry handling include the following:

Carry Ripple
Carry Save
Carry Propagate
Carry Select

The carry ripple parallel adder combines the parallel sum generating logic with what amounts to a serial carry mechanism. It is possible for a carry generated by the lowest order to propagate carries throughout all orders into the highest order or even produce a carry overflow out of the highest order. Depending upon word length, the carry ripple can be slightly time-consuming or can be a major speed limiter.

The parallel carry save adder operates on the assumption that addition is likely to be repetitive. The sums on a bit-by-bit basis are produced in parallel and the carries on a bit-by-bit basis are also produced in parallel. There is no carry propagation at all. Carries developed during operation are delivered to a set of storage devices on a bit-by-bit basis. These storage devices "save the carry." Signal indications produced by the carry-save storage devices are applied to the bit-by-bit sum logic so that on the succeeding addition cycle there are effectively three binary operand bits presented to the adder logic—the augend, the addend, and the carry-save (from the previous addition). The carry-save adder thus might be characterized as a three-input half adder. It accepts as inputs the addend, augend and carry and produces an intermediate result—oddness sum and save carry—rather than the final sum. The term "oddness" here refers to a binary sum value of one, produced when the three input operands include an odd number of binary ones. A final dummy addition cycle is required to insert the carry into the final total.

The carry propagate parallel adder provides a logically developed carry for each bit position simultaneously with the logically developed sum. In adders for a large word size, the carry propagate logic may be many times as complex as the sum development logic, since the carry for a particular bit order such as bit $2^4$, depends upon the carry generate signals from lower order bit positions ($2^3$, $2^2$, $2^1$, $2^0$) as well as upon carry propagate signals from the lower order bit positions. Logic is provided to produce a carry into the particular bit order, such as bit $2^4$, whenever the appropriate conditions for a carry occur. These conditions are: carry generate in a lower order together with carry propagate through all intervening orders. For example, a carry generate from order $2^1$ and carry propagate in orders $2^2$ and $2^3$ produces a carry into order $2^4$. For high orders such as $2^{32}$, it is apparent that the carry logic must be extensive.

The carry select adder is in the form of two adders. One adder anticipates a carry and the other adder anticipates a no carry. The sum with carry is available as is the sum without carry. The carry indication selects the output of one or the other of the two adders. This type of carry provision is applicable to a serial adder, or to a composite of carry-propagate groups within a large adder. It has even been applied to binary-decimal radix correction by selecting, under control of a binary no-carry or binary carry the output of a binary adder or an excess-6 binary adder, respectively.

This invention freely borrows mechanism and philosophy from prior art adders, amalgamating certain features of carry propagate, carry save and carry select adders into a logic unit having very fast logical connective and true variable radix addition capabilities.

The prior art has also shown bit-by-bit logical connective mechanisms, generally as a matter of chance in switching logic but also in universal decoder setups.

Exemplary of prior art are the following U.S. patents:

ADDERS

U.S. 2,803,401—August 20, 1957—Nelson—Arithmetic Units for Digital Computers, Hughes Aircraft.

U.S. 2,609,143—September 2, 1952—Stibitz—Electronic Computer for Addition and Subtraction—no assignee listed.

U.S. 2,719,670—October 4, 1955—Jacobs—Electrical and Electronic Digital Computers—no assignee listed.

U.S. 2,879,001—March 24, 1959—Weinberger et al.—High Speed Binary Adder Having Simultaneous Carry Generation—U.S. (Secretary of Commerce).

U.S. 2,981,471—April 25, 1961—Eachus—Information Manipulating Apparatus—Minneapolis-Honeywell.

U.S. 2,989,237—June 20, 1961—Duke—Coded Decimal Adder Subtractor—ICT.

U.S. 2,954,168—September 27, 1960—Maddox—Parallel Binary Adder-Subtractor Circuits—Philco.

U.S. 2,991,009—July 4, 1961—Edwards—Coded Digit Adder—NCR.

COMPARATORS

U.S. 2,959,768—November 8, 1960—White et al.—Comparator—IBM.

LOGICAL CONNECTIVES

U.S. 2,820,897—January 21, 1958—Dean et al.—Universal Gating Package—Computer Control Corp. Inc.

ZERO CHECKERS

U.S. 2,905,383—September 22, 1959—Bruce—Register Zero Test—IBM.

OBJECTS

The objects of the invention are:

(1) To perform specified logical operations upon coded operand bytes presented to the logic unit.

(2) To perform a variety of logical operations upon a plurality of operand bytes presented to the logic unit.

(3) To perform selective logic including true variable-radix algebraic addition upon a plurality of data bytes presented to the logic unit in consideration of a modulus byte simultaneously presented to the logic unit.

(4) To perform selective bit-by-bit logical connective operations upon a plurality of data bytes presented to the logic unit.

(5) To perform full parallel high-low-equal comparison upon a plurality of data bytes presented to the logic unit and generate control signals indicating results of the comparison.

(6) To perform selection of one of the presented operand bytes according to a number of criteria such as Max. (P, Q), Min. (P, Q), $P>Q$, $P\equiv Q$, etc.

(7) To provide parity indications on logical connective results.

SUMMARY—SEE FIG. 1

The variable radix logic unit combines an addend byte P from register 101 with an augend byte Q from register 102 according to a modulus byte M from register 103. Bytes P and Q are presented in parallel to binary adder 104 and also to trinary adder 105. Byte M is presented to trinary adder 105 only. Trinary adder 105 selectively provides at one time (under control of program unit 106) a binary full sum of three operands P, Q and M (actually $P+Q-M$, $P-Q+M$, $Q-P+M$) and at another time a bit-for-bit logical connective of bytes P and Q. Connective parity generator 109 provides parity indications of the result of connective operations, which are useful for program modification and control. The logical connective parity signals pass to inference register F 112. For variable radix addition, gate control circuit 107, which is responsive to carry out signals from the binary and trinary adders 104 and 105, selects the output of binary adder 104 (correct for sums less than the radix) or of trinary adder 105 (correct for sums greater than the radix). Gates 110 and 111 pass the selected adder output to R register 113. Trinary adder 105 comprises three-input carry save logic feeding a two-input carry propagate adder. The carry save logic develops logical connectives with no additional mechanism. Status indicator block 108 sends comparison signals to F register 112.

FEATURES

Features of the invention are:

(1) The provision of a binary adder to which two operand bytes are presented in parallel for addition in standard binary fashion, together with the provision of a trinary adder to which the identical two operand bytes and a modulus byte are presented simultaneously. The modulus byte provides radix correction. The binary adder thus provides a full sum (including carries) for the two presented bytes which is correct if the radix is not exceeded. The trinary adder provides a full sum (including carries) which is correct if the radix-modulus is exceeded. The binary adder and trinary adder provide carry signals which condition gate control circuits to select the appropriate adder output as the correct sum.

(2) The provision of parallel carry save logic as the first stage of the trinary adder with a carry propagate adder as the second stage. This produces full parallel three-input binary sums of addend, augend and modulus.

(3) The provision for development of a full set of logical connectives of two data bytes on a bit-by-bit basis in the carry save logic of the trinary adder with a minimum of additional mechanism.

(4) The provision for development of a test for equality on the basis of the half-sums of the difference $P-Q$ or $Q-P$ produced by the first stage of the binary adder.

(5) Utilization of microprogramming techniques by which instruction word bits can directly condition logic blocks for the particular instruction.

ADVANTAGES

Advantages of the invention are:

(1) Complete variable radix capability. The modulus byte can provide correction to a complete variety of radices up to the maximum value of the adder.

(2) The development of bit-by-bit logical connective signals at minimum expense, gating directly from a single instruction for each connective. For example, the connective $P v \overline{Q}$ is set up directly by the bit structure 1011 of the Logical Connective 11 ($P v \overline{Q}$) instruction.

(3) Full parallel operation during a 250 nanosecond total variable radix add time.

(4) Almost any number of arithmetic and logical operations can be performed by the relatively simple logic unit by providing it with appropriate program control.

The foregoing and other objects, features and advantages of the invention will be apparent from the following more particular description of a preferred embodiment of the invention, as illustrated in the accompanying drawings.

| Page | Figure | |
|---|---|---|
| 15 | 1 | Logic Unit block diagram. |
| 17 | 2 | Timing—chart. |
| 20 | 3 | Operations & Gating—chart. |
| 24 | 4 | Trinary Adder Logical Function Generator—schematic block diagram of the carry save logic section of the trinary adder. |
| 30 | 5 | Trinary Adder Carry Generator—schematic block diagram. |
| 32 | 6 | Trinary Adder Bit Preformer—schematic block diagram. |
| 33 | 7 | Trinary Adder Sum Former—schematic block diagram. |
| 36 | 8 | Binary Adder Logical Function Generator—schematic blodk diagram. |
| 38 | 9 | Binary Adder Bit Preformer—schematic block diagram. |
| 39 | 10 | Binary Adder Sum Former—schematic block diagram. |
| 40 | 11 | Status Indicator—schematic block diagram. |
| 43 | 12A–12B | Gate Control—schematic block diagram. |
| 45 | 13 | Trinary Adder—block diagram. |
| 46 | 14 | Connective Parity Generator—schematic block diagram. |

The specification follows the format of the figures; the page numbers indicate the start of the most complete explanation of the appropriate figure. The list of figures thus serves as a table of contents.

Duplications of circuitry have been deleted from the figures in favor of brevity and the clarity which depends upon brevity. Terminal boards appear on many of the figures as signal tap and label points. Where several signals are produced by similar logical circuitry, only a representative signal production circuit is shown. Other similar signals are deemed to be available at the terminal board. It is to be noted that the terminal boards are included in the application as label points primarily; the speed requirements of the logic unit generally make direct connection by short wires more desirable than terminal board connections. The imaginary terminal boards make each figure self-sufficient; there is generally no need to trace signals from figure to figure. Reference characters include the figure number and two final digits— number 101–116 are first shown in FIG. 1; numbers 1101–1113 are first shown in FIG. 11. Where the same item appears in more than one figure, it retains the reference number of its first appearance. Terminal board 505, for example, appears in both FIG. 5 and FIG. 6.

LOGIC UNIT—FIG. 1

The logic unit is primarily designed as the basic processor for a computer having the usual features of memory, processor, and program unit. The program unit derives a format of operation from a series of instructions stored in the memory and operates suitable electronic gates throughout the computer to move data from memory to the processor and to move processing results on to the memory.

Although the memory and program areas of a general purpose computer are complex and heavily interrelated with all other sections of the computer including the processor, for purposes of understanding this invention both memory and program unit may be considered simple. The function of the memory is to provide operand bytes P and Q to registers 101 and 102, respectively; to provide a modulus byte M to register 103; and to receive a sum byte R from register 113; or to receive an inference byte F from register 112. Program unit 106 controls each function. Gate 114 allows byte P to pass directly to register R 113 when required. Operation register 115 and decoder 116 within program unit 106 connect with adders 104 and 105 in control fashion.

Full advantage of the speed of the logic unit requires very high speed memories or memory multiplexing so that registers P, Q, M, R and F can be serviced each logic cycle. Techniques for such memory multiplexing may include high-speed buffers with ring-controlled gating or more complex techniques for byte streaming from large high-speed memory buffer registers according to program requirements.

The logic unit combines an addend byte P from register 101 with an augend byte Q from register 102 and with a modulus byte M from register 103. Bytes P and Q are presented in parallel to binary added 104 and also to trinary adder 105. Byte M is presented to trinary adder 105 only. Trinary adder 105 selectively provides (under control of program unit 106) a binary full sum of three operands P, Q and M or a bit-by-bit logical connective of bytes P and Q. Connective parity generator 109 provides parity of logical connective result signals to F register 112; the logical connective result passes to R. For variable radix addition, gate control circuit 107, which is responsive to carry out signals from the binary and trinary adders, selects the output of binary-adder 104 (correct for sums less than the radix) or of trinary adder 105 (correct for sums equal to or greater than the radix). Gates 110 and 111 pass the selected adder output to result R register 113. Trinary adder 105 comprises a three-input carry save adder in tandem with a two-input carry propagate adder.

The carry save adder develops logical connectives with no additional mechanism. During logical connective operations, the modulus byte M is effectively both all 1's and all 0's. This effectively causes the modulus to be ignored.

Status Indicator 108 monitors adder results and sends signals indicating the value of a comparison of input bytes P and Q to inference F register 112.

FIGURE 1 relates the other figures as an overall block diagram. Binary adder 104 includes a logical function generator (FIG. 8), a bit preformer (FIG. 9) and a sum former (FIG. 10). Special function indication signals are developed in status indicator 108 (Fig. 11).

Trinary adder 105 includes as its first stage, or carry save logic, a logical function generator (FIG. 4). Trinary adder 105 also includes as a second stage, or carry propagate adder stage, a byte carry generator (FIG. 5) a bit preformer (FIG. 6) and sum former (FIG. 7). Control of gating to accept selectively the output of either the binary adder 104 or the trinary adder 105 or of P register 101 directly is by gate control block 107 (FIG. 12).

The logical connective is developed from the first stage of the trinary adder, from which the connective results pass via the carry propagate adder and Gate TS block 111 to output register R 113 while the parity indications generated by connective parity generator 109 pass to the inference F register 112.

TIMING—FIG. 2 (SEE ALSO FIG. 1)

The basic cycle of 250 nanoseconds for register operation is followed. Registers P, Q, M, R and F are each in condition to accept data upon the leading edge of the 250 nanosecond square wave clock pulse. The actual setting of the register takes place at component-limited maximum speed, with dynamic change within the register enabled by the clock pulse. Between clock pulses dynamic change is disabled. The entire logic unit is enabled simultaneously by clock pulses from a single source. The flow of logic is asynchronous during the enabled portion of the cycle, during which many circuits are set up for their ultimate function. All sections of the logic unit are designed to complete their functions prior to the following clock cycle pulse rise.

The registers are generally latches. They are subject to dynamic change during the enabled portion of the clock cycle, during which they attain a state dependent upon their inputs. They retain this state during the remainder of the enabled portion of the cycle and through the following disabled portion of the cycle. The latch is set during the clock pulse (enabled); it retains useful information in static form during the period between clock pulses (disabled). During the disabled period the information flow path is set up to the next register down stream. A more complete description of latch registers and their operation is included in a copending application of Robert M. Meade, Transistor Circuits for Digital Computers, Serial Number 027,235, filed April 14, 1960, and commonly assigned with this application.

The timing diagram shows a space of 1 microsecond during which four basic logic cycles occur. On the first cycle, operand bytes P and Q and modulus byte M are latched in their respective registers. Logical manipulations begin immediately and are to be completed during the following 250 nanoseconds. At the start of the second logic cycle, the logical result of the first cycle (S1) is gated onward into register R (setting the latches which are enabled for dynamic change) and new operand and modulus bytes are latched in registers P, Q and M.

The second logical operation is thus undertaken, to develop S2. The logical result for any given operation is gated into sum register R at the same time that the logical operand and modulus bytes for the next logical operation are being gated into the P, Q and M registers.

At the leading edge of the fifth pulse, the S4 sum (result of the fourth logical operation) is available at register R as the output of the logic unit.

Selection of the mode and final control of operation of the logic unit is by means of computer program unit 106, which reflects in signals understandable by the functional units of the machine the orders contained in the stored program. The stored program in turn bridges the gap between the human having problem responsibility and the computer.

The actual program unit in the type of large-scale general purpose computer to which the logic unit is best fitted is likely to be complex and extremely flexible in the type of operations under its control. Nevertheless, correct operation of the logic unit of this invention for each of the several operations in its basic repertoire can be controlled by a few program signals such as those shown to be available at program terminal boards associated with the various mechanisms. The program unit must operate the memory in such manner that modulus byte M and bytes P and Q are available when necessary and that space is available for storage of sum bytes S in the R register 113 or logic connective status bytes F in the F register 112. The R and F registers, of course, need not feed directly into the memory but their outputs may be subjected to further processing under program unit control by other sections of the general purpose computer.

A suitable source for P, Q and M bytes is the output of an editing unit. Such a unit is disclosed in copending U.S. patent application of Robert M. Meade, Editing Unit, Serial Number 066,251, filed October 31, 1960, and commonly assigned with this application.

OPERATIONS AND GATING—FIG. 3

FIGURE 3 illustrates the operations repertoire of the logical unit and the relationship between the inputs P, Q and M. Logical and arithmetic operations are selected by a binary numeric code in the value range 16–31. Logical connective operations, not shown in FIG. 3, are selected by a binary numeric code in the value range 0–15, according to the chart below:

| Connective: | Number |
|---|---|
| All zeros (don't care) | 0 |
| PQ | 1 |
| P$\bar{Q}$ | 2 |
| P (don't care Q) | 3 |
| $\bar{P}$Q | 4 |
| Q (don't care P) | 5 |
| P$\veebar$Q (EXCLUSIVE OR) | 6 |
| PvQ | 7 |
| $\overline{PQ}$ | 8 |
| P≡Q (identity) | 9 |
| $\bar{Q}$ (don't care P) | 10 |
| Pv$\bar{Q}$ | 11 |
| $\bar{P}$ (don't care Q) | 12 |
| $\bar{P}$vQ | 13 |
| $\bar{P}$v$\bar{Q}$ | 14 |
| All Ones (don't care) | 15 |

For logical connective operations, Gate In is —M, all 1's; True P; True Q.

The chart shows the operation (OP) codes as decimal numbers. These OP codes are actually the binary equivalents of the listed decimal numbers 0–31. The pattern of bits forming the OP code specifies the operation.

The OP code bit pattern is decoded into signals which are used to control gates. Operation 16, for example, gates "true P" and "complement Q" to the adders; operation 30 gates "all 1's" as a substitute for the modulus M, and "true P" and "true Q." OP codes are assigned class numbers I or II depending on which operand is complemented.

The next major column, "OPERATION PERFORMED," of the chart also explains the operation performed in algebraic formula or short statement form. OP 30, for example, is $P+Q$/binary/ while OP 31 is $P+Q$/modulo M/.

The next two major columns, "CARRY OUT" and "NO CARRY OUT," explain the significance of carry signals. In OP 17, for example, a binary carry out signal ($\sqrt{}$ under "BIN") indicates (under "IND") $P \geq Q$, while a binary "no carry out" signal indicates $P<Q$.

The next major column is "GATE OUT." In OP 31, for example, a trinary carry out signal, which indicates $P+Q \geq M$ (TRI $\sqrt{}$, IND $P+Q \geq M$, under CARRY OUT) gates FUNCTION ($P+Q$/base M/) from the TRINARY adder. Similarly, under column NO CARRY OUT, a trinary no carry out signal (TRI $\sqrt{}$ IND $P+Q<M$) which indicates $P+Q<M$ gates the function $P+Q$/base M/ from the BINARY adder.

Operation 31 being one of the most complex operations, a full modulo M addition, its explanation should clarify the entire FIG. 3 chart. It is desired to add P and Q and correct the sum to modulo M. If the sum $P+Q$ does not exceed the radix (4+3 does not exceed the radix 10) the correct sum is the output of the binary adder, $P+Q$. If the sum $P+Q$ exceeds the radix (4+8 exceeds the radix 10) the correct sum is the output of the trinary adder, $P+Q-M$ (4+8—10=2).

To perform the modulo M addition, register M is complement gated to the trinary adder and registers P and Q are each true gated to both the binary adder and the trinary adder. The output of the binary adder is thus $P+Q$; the output of the trinary adder is $P+Q-M$. If $P+Q-M$ produces a carry out of the high order, then $P+Q \geq M$ and the trinary adder output, which includes radix correction as a result of adding —M, is selected as correct. If there is no carry out of the trinary adder, then $P+Q<M$ and the binary adder output is selected as correct.

*Example 1.*—Add 5+6/base 8/. The sum 11 exceeds the radix 8 by 3. $P=5$; $Q=6$; $M=8$. The gating is 5+6 to the binary adder and 5+6+(8, the 2's complement of binary 8) to the trinary adder. 5+6+8=19, or 3+trinary carry out of the 8's order. The trinary carry causes gating to be from the trinary adder. The correct sum is 3 plus carry/base 8/.

*Example 2.*—Add 2+3/base 7/. The sum 5 does not exceed the radix 7. $P=2$; $Q=3$; $M=7$. The gating is 2+3 to the binary adder and 2+3+(9, the 2's complement of binary 7) to the trinary adder. There is no carry out of either adder; the "no carry out" of the trinary adder causes selection of the output of the binary adder (2+3=5) as correct.

The adders in the preferred embodiment use binary values; the examples have been somewhat simplified by using decimal values. FIGURE 3 provides all necessary gating information for the repertoire of operations; this information is implicit in circuits to be described in detail.

OP's 18–23 provide equals comparisons of operands P and Q by examination of the binary half sums, rather than the adder carries. Half sums are either "all 1's" or "not all 1's" and operation control depends upon the "all 1's" condition. In OP 20, for example, P is true gated and Q is complement gated to the binary adder. The binary half sum "all 1's" indicates $P=Q$ and causes a "no gate" to set the R register to "all 0's." The binary half sum "not all 1's" indicates $P \neq Q$ and causes gating of P direct to the R register. This fulfills the OP 20 function shown under the OPERATION PERFORMED column $(P \neq Q \rightarrow P)(P \neq Q \rightarrow 0's)$.

TRINARY ADDER LOGICAL FUNCTION GENERATOR—FIG. 4

The trinary adder (see FIG. 1, block 105) receives inputs from each of three registers P, Q and M. Its function is to provide a full trinary sum according to its gating or selectively to provide bit-by-bit logical connectives of the bytes from registers P and Q. FIGURE 4 illustrates representative trinary propagate and trinary generate logic. Only one order (blocks 401–411) and a terminal board 412 are shown. The logic of position 1 is duplicated for each other bit position 2–8. Blocks 401–404 and 408 are microprogramed to generate partial sum bits during modular addition operations in response to bit signals from the bit-1 positions of registers P, Q and M. During logical connective operations these same blocks are microprogramed to generate the modulus function in response to the forced equivalent of both the modulus bit and not-modulus bit and bit signals from the bit-1 positions of registers P and Q.

Blocks 405–407 and 409 develop the trinary carry generate signal by directly decoding each of the three situations which can produce such a trinary carry generate (which is really a majority factor) for the particular bits (position 8 shown) of registers P, Q and M. These situations are P8Q8, Q8M8 and P8M8.

During modular addition and other add mode operations, the four inputs to block 401 must all be conditioned by $-n$ signals to provide a $-n$ output. The $\overline{P}1$ signal indicative of a 0 in the 1 position of register P and the $\overline{Q}1$ signal, indicative of a 0 in the 1 position of register Q, and the M1 signal, indicative of a 1 bit in the 0 position of modulus register M1, when combined, produce a 1 bit as the partial sum. The third input is conditioned by the OP 16–31 signal in the add mode. With all four inputs negative, $-Ap$ block 401 provides a negative output which passes to $-On$ block 408, conditioning block 408 to provide at terminal board 412 and at $Cn$ block 410 a $-n$ TPS1 signal. The convert $Cn$ block 410 provides a $+p$ TPS1 and a $-p$ TPS1 signal at the terminal board.

Another possible source of a trinary partial sum 1 bit for position 1 is the appearance of 1-bits in position 1 of each of the three registers M, P and Q. These three signals and the OP (16–31) signal applied as $-n$ inputs to $-Ap$ block 402 provide an output which conditions $-On$ block 408 and provides the $-n$ TPS1 signal and via block 410 the $+p$ and $-p$ TPS1 signals. Other situations where there is oddness in position 1, in which TPS1 signals should appear, are $\overline{P}1$, Q1, $\overline{M}1$ at $-Ap$ block 403 or $\overline{M}1$, P1, $\overline{Q}1$ at $-Ap$ block 404. Blocks 401, 402, 403 and 404 thus each recognize a particular oddness situation of position 1 in the three registers M, P and Q and provide outputs indicative of these four possible oddness situations. $-On$ block 408 and $Cn$ block 410 process the oddness outputs to provide the $-n$, $+p$ and $-p$ voltage levels of the TPS1 signal. TPS signals for the other bits 2–8 are similarly prepared.

COMPONENTS

Because maximum speed is an objective, the preferred embodiment uses high-quality current-mode transistor circuits. These circuits are more fully described in the following:

Transistor Theory and Application, Customer Engineering Manual of Instruction, IBM form 223–6783–1, 1959, pages 43–48.

Component Circuits, Customer Engineering Manual of Instruction, IBM form 223–6875–1, 1960, pages 17–35 and following.

Circuits operate on $+n$, $-n$, $+p$ and $-p$ voltage levels. The input and output levels are shown in the diagrams by small $n$ or $p$ characters at the bottom of the blocks.

The circuits perform the following logical functions:

A—AND. Output when all inputs are conditioned.
—A—minus AND. Output when all inputs are minus conditioned.
O—OR. Output when any input is conditioned.
—O—minus OR. Output when any input is minus conditioned.
C—Convert. Signal input is converted from $n$ to $p$ level or from $p$ to $n$ level for output.
⊻—Exclusive OR. Output when one but not both inputs are conditioned.

LOGICAL CONNECTIVE OPERATION—FIG. 4

During logical connective operations, one input to each of $-Ap$ blocks 401–404 is continuously conditioned by the OP (0–15) signal, which simulates both a 1-bit and a $\overline{1}$-bit in the modulus register M. P1, Q1, $\overline{P}1$ and $\overline{Q}1$ signals are applied directly from the respective registers. The bit structure of the logical connective operation instruction is used directly to control $-Ap$ blocks 401–404 to provide the proper logical connectives. Logical connective operation 0, for example, must fail to produce any TPS signal because the bit structure of the instruction does not contain an OP C 8 bit which is required by $-Ap$ block 401, an OP C 1 bit which required by $-Ap$ block 402, an OP C 4 bit signal which is required by $-Ap$ block 403 or an OP C 2 bit which is required by $-Ap$ block 404. Logical connective operations are specifically limited to operations 0–15 so the OP (16–31) signal is also not available during these periods.

For logical connective 1 (PQ) only $-Ap$ block 402 is conditioned since only the OP C 1 bit signal appears. $-Ap$ block 402 is conditionable by an OP (0–15) signal on its first input, P1 on its second input, Q1 on its third input and OP C 1 bit on its fourth input to provide via blocks 408 and 410 the TPS1 signal at terminal board 412. The $-Ap$ block 402 thus provides the TPS1 signal upon occurrence of P1 and Q1 during logical connective 1 (PQ).

$-Ap$ block 404 is effective to provide logical connective 2 ($P\overline{Q}$) upon occurrence of the OP C 2 bit signal during logical connective operations.

$-Ap$ block 401 is effective to provide the $\overline{PQ}$ logical connective 8 upon occurrence of the OP C 8 bit signal during logical connective operations.

Other logical connective operations involve composites of 1, 2, 4, 8 bits in the logical connective instruction. For example, logical connective operation 5 is Q (don't care P). $-Ap$ blocks 402 and 403 are each effective to provide the TPS1 signal upon occurrence of a related condition within the Q (don't care P) logical situation. Block 402 responds to the PQ situation, and block 403 responds to the $\overline{P}Q$ situation, each by providing the TPS1 signal.

Logical connective operation 12 is $\overline{P}$ (don't care Q) and involves blocks 401 and 403. Block 401 responds to the $\overline{PQ}$ situation and block 403 responds to the $\overline{P}Q$ situation to provide the TPS1 signal upon receipt of information indicating $\overline{P}$ (don't care Q).

Logical connective 14 is $\overline{P}v\overline{Q}$. The $-Ap$ blocks 401, 403 and 404 respectively provide a TPS signal upon occurrence of $\overline{PQ}$, $\overline{P}Q$ or $P\overline{Q}$. $\overline{PQ}v\overline{P}Qv P\overline{Q}$ is factorable $\overline{P}(\overline{Q}vQ)$ $v$ $P\overline{Q}$ which is immediately reduced to $\overline{P}v P\overline{Q}$ by removing the redundant logical term $(\overline{Q}vQ)$. $\overline{P}v P\overline{Q}=\overline{P}v\overline{Q}$, since the $\overline{P}$ term includes $\overline{PQ}$, the only situation which the P term in ($P\overline{Q}$) excludes. Accordingly, the final result of logical connective 14 is $\overline{P}v\overline{Q}$.

Logical connective 15 is "all 1's," a complete "don't care." $-Ap$ blocks 401, 402, 403 and 404 are all conditioned by their respective instruction bits inputs 8, 1, 4 and 2. Regardless of what the bit structures in position 1 of registers P and Q are, one of the four blocks is conditioned to provide the TPS signal at terminal board 412.

During add mode operations, majority $-Ap$ blocks 405, 406 and 407, $-On$ block 409 and $Cn$ block 411 combine to produce trinary carry generate terms for position 8 at terminal board 412. $-Ap$ block 405 is receptive to the P8Q8 situation during modulus M and binary add operations, as indicated by the OP (28–31) enabling signal. Block 406 is receptive to the Q8M8 situation in block 407 and to the P8M8 situation to provide at $-On$ block 409 a signal for each of the three possible carry generate situations for position 8.

Similar circuits are provided for each bit position (1–8) in the trinary adder so that TPS signals 1–8 and TCGT signals 1–8 are available to those circuits in other figures in which they are required as inputs.

FIGURE 4 illustrates the "carry save logic" section of the trinary adder. The carries are not really saved, since they are available directly to the two-input binary carry propagate adder which forms the final stage of the trinary adder, rather than stored in triggers as in the usual carry save adder. To achieve the speeds desired, the carry save logic and the carry propagate adder of the trinary adder are somewhat intermingled, wherever the intermingling helps to achieve the objectives of speed, accuracy and overall economy.

The basic function of the carry save logic section is to reduce from three to two inputs. It provides to those succeeding circuits which require them the oddness function of the three inputs P, Q and M (TPS signals) and the majority function of the three inputs P, Q and M (TCGT signals). The normal usage of these functions in a carry save adder is as the partial sum (TPS) and as the carry to be saved (TCGT). In a true carry save adder, however, the M input would not be from a modulus register, but rather from the group of carry save triggers, so that the third input to the carry save adder would be the saved carries. The term "carry save logic," descriptive of the first level of the trinary adder, differs from the standard carry save adder description in these particulars:

There are no carry save triggers.

There are no carry inputs, but modulus inputs instead. Throughout this patent application the term "carry save logic" always carries this meaning.

The carry generator accepts trinary partial sums TPS1–8 and trinary carry generate term signals TCGT1–8 from FIGURE 4, and on suitable modular addition operations provides via logic block 501–504 and 506–516 the required trinary group carry generate and propagate signals for groups 1–4 and 5–8. Intermediate trinary carry generate signals TCG1–8 and trinary propagate signals TP1–8 are made available at terminal board 505. Carries out of the group in the FIG. 5 circuit are TG1–4, a generate carry out of position 4 of the 1 to 4 group; TP5–8, a propagate term for position 8 of the 5–8 group; and TG5–8, a generate term for position 8 of the 5–8 bit group.

The trinary group carry signal TG1–4 is produced by lookahead carry mechanism of standard type. Block 514 has four inputs which respectively respond to an assigned one of the four situations which can cause a group carry. The low input of the four is connected directly from TCG4 from terminal board 505, a trinary carry generate signal from the bit-4 position. The next input causes a TG1–4 signal upon coincidence of a carry generate signal TCG3 and propagate signal TP4 at −A$p$ block 508 to provide a group carry from group 1–4. Stated functionally, −A$p$ block 508 responds to the situation where position 4 is in carry propagating state and a carry is introduced into position 4 from position 3. −A$p$ block 507 responds to signals TCG2, TP3 and TP4, allowing a carry generated in position 2 to propagate through positions 3 and 4 and via −O$n$ block 514 provide the TG1–4 signal at terminal board 517. Similarly −A$p$ block 506 responds to the carry generate condition in position 1 and to propagate situations in positions 2, 3 and 4 to provide via O$n$ block 514 the TG1–4 signal at terminal board 517. Block 501 (which includes −A$p$ block 502 and −O$p$ block 503) and block 504 (which includes −A$p$ 518 and −O$n$ block 519) together with six other blocks (not shown) similar to block 504, provide at terminal board 505 TCG and TP signals 1–8. The TCG signals are trinary carry generate signals. Block 501 is specifically for the units order and responds to the trinary partial sum signal TPS1 and to a "hot one" in operations 28, 29 and 31. In each of these three operations (see operations charge FIGURE 3) there is a complement input, either P, Q or M. Proper handling of complements requires the insertion of a "hot one" in the units order to anticipate the end-around carry. Occurrence of both the TPS1 signal and the hot one conditions −A$p$ block 502 and −O$n$ block 503 at 1 to provide at terminal board 505 both the trinary carry generate signal TCG1 and the trinary propagate signal TP1. The TPS1 signal alone provides via −O$n$ block 503 only the TP1 signal.

The trinary partial sum signal TPS from FIGURE 4 for a particular bit position is combined with the trinary carry generate term TCGT signal for the preceding bit position to provide for the bit position a TCG signal and a TP signal at terminal board 505. For bit position 7, TPS7 and TCGT6 combine as inputs to −A$p$ 518 to provide the TCG7 signal and combine as inputs to −O$n$ block 519 to provide the TP7 signal at terminal board 505. Other bit positions 2–6 and 8 are handled similarly to bit position 7.

TRINARY ADDER BIT PREFORMER—FIG. 6

Trinary propagate signals TP and trinary carry generate signals TCG are available from terminal board 505. Convert blocks C$n$ 601 and C$n$ 602 convert the TP and TCG signals respectively to desired voltage levels at terminals A$v$B and AB respectively of terminal board 603. The opposite voltage level provides ($\overline{AvB}$) and ($\overline{AB}$) values. These intermediate or preformed bits are used by the circuit in FIGURE 7 in combining functions to produce the sum. C$n$ block 605 similarly provides a binary carry in signal TCT2 at desired voltage levels by converting the TCG1 signal. A trinary propagate signal TP2 together with the trinary carry generate 1 signal TCG1 join as −$n$ inputs to −A$p$ block 606 to provide via −O$n$ block 607 the TCT2 signal at terminal board 617. The TCT signals are effective "trinary carry to—" signals. The trinary carry to 4 signal TCT4 at terminal board 617 is similarly generated via −O$n$ block 610 upon occurrence of one or more of three situations as follows:

(1) Trinary Carry Generate 1+Trinary Carry Propagate 2 and 3, TCG1, TP2, TP3 at −A$p$ block 608.

(2) Trinary Carry Generate TCG2 and Trinary Propagate TP3 at −A$p$ block 609.

(3) Trinary Carry Generate TCG3 on the low input of −O$n$ block 610.

In the 5–8 group, trinary propagate inputs TP5 and TP6 join as inputs to −A$p$ block 611 to produce an intermediate function, trinary propagate bypass to position 7 TPB7. Trinary Carry Generate 5 signal TCG5 and trinary propagate term TP6 combine at −A$p$ block 613 and pass via −O$n$ block 614 to provide the TCT7 trinary carry into 7 signal at terminal board 617. A carry generate signal from position 6, TCG6 on the lower input of block 614, also provides the TCT7 signal. Intermediate trinary propagate bypass to 8 signal TPB8 is provided by trinary propagates 5, 6 and 7 to −A$p$ block 615 with conversion by C$n$ block 616 to proper voltage levels. C$n$ block 618 converts the TP5 signal to a TPB6 signal at proper voltage level. The propagate bypass to signals indicate a string of propagates, thus allowing development of high order carries conveniently early.

The function of the trinary adder carry generator and bit preformer is to accept functions TCG and TP which are the output of the logic (FIG. 4) and provide intermediate functions which can be combined by the circuitry of the trinary adder sum former. FIGURES 5, 6 and 7 show circuits which form the trinary sum.

TRINARY ADDER SUM FORMER—FIG. 7

FIGURE 7 illustrates a receiving terminal board 701, circuitry 702–709 for logically combining the signals from terminal board 701 and connecting the combinatorial results to terminal board 710, and logic 711–719 for combining signals from terminal board 710 to provide a final level of logic and gating and provide the final binary sum bits at R register 113. A gate trinary signal at the top of terminal board 710 is supplied by circuitry to be explained infra (FIG. 12) which provides a final level of gating to bits 1–8. Bit 1 of the sum is developed by by EXCLUSIVE OR circuit 702 from −$n$ signals TPS from FIGURE 4 and the HOT 1 signal (OP 28 29, 31), converted by C$p$ block 703, gated by A$n$ block 715 to provide the the one bit of the sum. Since carries cannot generally affect the low order bit, production of the 1-bit of the sum is simply the exclusive or function of the HOT 1 and the 1-bit of the partial sum. Development of the 2-bit of the trinary sum requires some additional effort. The signals (AvB) 2 and $\overline{(AB)}$ 2 provide —A$p$ block 704 with an oddness output, or half sum [(AvB)$\overline{(AB)}$2] which is an oddness factor for position 2. This oddness factor combines with the TCT2 signal at EXCLUSIVE OR 711 to provide via gate 716 the 1-bit for position 2. $\overline{(AB)}$ is available at —$p$ level. Circuits for forming sum bits 3 and 4 are similar to the circuit for forming sum bit 2.

The circuits for forming sum bits 5-8 are more complex since they must take into consideration the possibility of a group carry from bit group 1-4. Accordingly, the position 5 bit is produced by —A$p$ block 705 in the situation where there is one 1-bit but not two and where there is no group carry from group 1-4. —A$p$ block 705 is an oddness factor available upon receipt of —$p$ signals (AvB)5 and $(\overline{AB})$5 to condition one input of —A$p$ block 712. The other input of —A$p$ block 712 is conditioned by a —$p$ $(\overline{TG1-4})$ signal so that —A$p$ block 712, gated by A$n$ block 717, provides at R register 113 terminals the position 5 bit upon recognition of an oddness situation with no group carry. —O$n$ block 706 is responsive to —$p$ signals (AB)5 $(\overline{AvB})$5 to provide an evenness factor at —A$p$ block 713. The other input to —A$p$ block 713 is —$p$ TG1-4, the group carry out of the low order four bits. Coincidence of the evenness factor signal and the carry-in at —A$p$ block 713 provides via gate A$n$ block 717 the bit for the five position of the sum.

Development of the bit for position 6 of the sum involves circuit blocks 707, 708, 714, 718 and 719. Gate blocks 718 and 719 provide a double function by performing as the final level of logic. A$n$ block 707 is responsive to the group carry from the low order four bits signal +$p$ TG1-4 and to the propagate situation in bit 5 as specified by signal +$p$ TP5 to provide an input to O$p$ block 714 representing the carry propagate to position 6 situation. The other input to O$p$ block 714 +$p$ TCT6 represents the carry generate situation in position 5 so that O$p$ block 714 provides a +$n$ $\overline{CT6}$ signal indicative of a "no carry into 6" situation in position 6 to A$n$ block 718 and provides a +$n$ CT6 signal indicative of a carry into position 6 to A$n$ block 719. Thus, final level gate blocks 718 and 719 function in mutually exclusive fashion to gate the output of —A$p$ block 708 according to the CT6 signal. Terminal board 701 provides inputs —$p$ (AvB)6 and —$p$ $(\overline{AB})$6 to —A$p$ block 708. If a carry into position 6 has occurred as indicated by a +$n$ CT6 signal to A$n$ block 719, there will be a position 6 bit developed in response to an evenness situation indication from —A$p$ block 708. —A$p$ block 708 responds to —$p$ signals (AvB)6 and $(\overline{AB})$6 to provide +$n$ signals $\overline{B6}$ (oddness) and B6 (evenness). Blocks 707-708 and 714, 718-719 thus develop the position 6 bit of the sum by carry lookahead techniques. The circuitry for positions 7 and 8 are similar to the circuitry for position 6. The signal +$p$ TCT8, which is not available at terminal board 617 of FIGURE 6, is developed by A$n$ block 709 from the +$p$ TCT7 signal and the +$p$ TPB7 intermediate signal.

BINARY ADDER LOGICAL FUNCTION GENERATOR—FIG. 8

FIGURE 8 shows a representative circuit for generating propagate and generate signals for the binary adder 104 (FIG. 1). Input signals from registers P and Q and from the program unit via terminal board 801 operate circuitry 802-809 to provide at terminal board 810 signals necessary to develop carry propagate lookahead. Circuit blocks 802-805 respond to situations which produce carry generates from position 1. —A$p$ block 802 responds to the P1Q1 situation to provide a P1Q1 signal at terminal board 810 and also to condition O$n$ circuit 805 to provide the binary carry generate 1 signal BCGH1 at terminal board 810. Blocks 803 and 804 respond to a HOT 1 input on operations other than 30-31 together with respectively a P1 or Q1 signal to condition O$n$ block 805 and provide the BCGH1 signal at terminal board 810. —A$p$ block 806 produces a $\overline{P1Q1}$ signal at terminal board 810 in response to those inputs.

Since the HOT 1 does not affect the second and higher orders, circuitry to provide the BCG2 and BP2 signals is less complex. —A$p$ block 807 directly provides the BCG2 signal in response to coincidence of P2 and Q2 at its inputs; —O$n$ block 808 directly provides the BP2 signals in response to either P2 or Q2 at its inputs. —A$p$ block 809 directly provides a $\overline{P2Q2}$ signal in response to those inputs.

Circuits to provide the binary carry generates and binary propagates of the other orders of the binary adder are similar to the circuitry for position 2. Terminal board 810 is assumed to have available all such signals. Circuit 811-814 to the right of terminal board 810 accepts binary carry generate BCG and binary propagate signals BP for orders 1-4 and provides a group carry out signal BG1-4 upon the occurrence of any of the four situations which will produce a carry out of position 4. These situations are defined by a binary carry generate 4 BCG4 signal; by a binary propagate 4 signal together with BCG3 at —A$p$ block 813; by BP4 together with BP3 and BCG2 at —A$p$ block 812; or by BP4 together with BP3, BP2 and BCGH1 at —A$p$ block 811. The outputs of —A$p$ blocks 811-813 and a direct connection from BCG4 pass via —O$n$ block 814 to provide the group carry signals BG1-4 at +$p$ or —$p$ levels as desired.

—A$p$ block 815 and its associated convert block C$n$ 816 respond to a full set of carry propagates in the group 5-8 to provide +$p$ and —$p$ BP5-8 signals. The function of this circuit is to allow an instantaneous carry propagation similar to that of a ripple through four high orders.

Circuit blocks 817-820 respond to situations which can provide a carry out of group 5-8. These situations are defined by propagate 8BP8 and carry generate 7 BCG7 at —A$p$ block 819; by BCG8 applied directly; by BP8 together with BP7 and BCG6 at —A$p$ block 818; and by BP8 together with BP7, BP6 and BCG5 at —A$p$ block 817. Group carries are thus available at terminal board 821; digit carries may be developed by combining the BP and BCG terms available from terminal board 810.

BINARY ADDER BIT PREFORMER—FIG. 9

Two virtually identical circuits can be used to make up the binary adder bit preformer. Terminal board 901, circuit blocks 902-914 and terminal board 915 make up the first circuit; terminal board 921, circuit block 922-934 and terminal board 935 make up the second circuit. The first circuit omits two A$n$ circuits which if included would be in positions 908 and 911, corresponding to 928 and 931.

One output of the bit preformer is the binary half sum signals BHS1-8, which are used in FIG. 10 to form the binary full sum when carries are inserted.

A$n$ block 905 develops the BHS1 signals in response to input P1Q1 and $\overline{P1Q1}$. The output of A$n$ block 905 is thus P1$\veebar$Q1, which another definition of the half sum.

A$n$ block 906 develops the BHS2 signal in response to inputs $\overline{P2Q2}$ and BCG2. BCG2, which is produced by —A$p$ block 807 in FIG. 8, is equal to P2Q2. A$n$ block 906 thus produces BHS2 in response to (P2Q2)$(\overline{P2Q2})$. Other half sum signals BHS3-8 are generated similarly by respective A$n$ blocks 913, 914, 925, 926, 933 and 934.

The bit preformer also produces BCT signals BCT1-BCT4 which are essentially "carry to" signals. BCT1 is produced directly from the OP30-31 signal at C$n$ block 910 and is a sort of HOT 1. BCT2 is produced directly from C$n$ block 909 in response to the BCGH1 signal, which is explained in connection with blocks 802–805 in FIG. 8.

BCT3, the carry lookahead into position 3, is developed by —On block 907 in response to the BCG2 signal or to output of —Ap block 902. An blocks 908 and 911 are not used.

BCT4, the carrylookahead into position 4, is developed by —On block 912 in response to each of the three carry situations which can affect position 4. A carry out of position 1, propagated through positions 2 and 3 conditions —Ap block 903 to provide BCT4. A carry out of position 2 propagated through position 3 conditions —Ap block 904 to provide BCT4. The carry generated from position 3, BCG3, conditions —On block directly to provide BCT4.

The circuits shown at the right in FIG. 9 which generate signals BCB6–8 and BPB6–8 are incomplete carry lookahead circuits which are to be completed in the binary adder sum former in FIG. 10.

BINARY ADDER SUM FORMER—FIG. 10

Circuit 1011–1016 is representative of circuits to produce the binary sum at terminal board 1017. An blocks 1015 and 1016 are the final gating stage and respond to a $+n$ gate binary signal from FIGURE 12a. EXCLUSIVE OR block 1013 provides the 1 bit in response to either a $+p$ BHS1 signal (half sum) or a $+p$ BCT1 signal (Binary Carry To 1). Since there can be no propagated carries into position 1, carry development is not a problem.

Representative of the other positions of the binary adder sum former is the circuitry shown for position 6. EXCLUSIVE OR circuit 1014 responds to either a $+p$ BHS6 signal (half sum) or to the output of $+An$ block 1011 through Op block 1012 in the absence of the $+p$ BHS6 signal. An block 1011 responds to conditions for propagating a carry into position 6; Op block 1012 also responds to signal $+p$ BCB6 (converted in FIGURE 9 from the binary carry generate term BG5)—together they provide an input to ⊻ 1014 whenever a carry into position 6 occurs.

Each position thus is provided with an ⊻ circuit, an output gate to terminal board 1017, and carry input logic to the ⊻ circuit.

STATUS INDICATOR—FIG. 11

Status indications are used with gating controls to select the proper output. In addition, they are used as inputs to the F register 112 (FIG. 1). Terminal board 1101 accepts inputs involving the binary group carry propagate and generate signals, control signals from the program unit, and signals indicative of half sum and carry functions. Circuit blocks 1102–1112 examine the inputs and provide at terminal board 1113 $+p$ signals $P>Q$, $P=Q$, and $P \neq Q$, and $a-p$ signal $P=Q$ gated during operations 16–29. $+Op$ blocks 1109 and 1112 provide the final form output to circuit board 1113.

The $P>Q$ signal from the first Op block 1109 is developed in any of An blocks 1102–1105 or by a FORCE KB TO ONE signal. An block 1102 responds to the coincidence of an enabling signal $\overline{\text{suppress}}$ and a program signal indicating the Op CLASS I. The Op CLASS I signal is derived by the program unit from examination of Op code bit structures (see FIG. 3 chart). Another input to An 1102 is $P \neq Q$ from terminal board 1113. Generation of this signal will be explained shortly. Another input to block 1102 is BG1–4, a binary generate term in the group 1–4 or more accurately, a carry out of position 4. Block 1102 thus indicates the condition where a carry generated in positions 1–4 propagates through positions 5–8 and where P is unequal to Q in Op class I to provide via $+Op$ block 1109 the $+pP>Q$ signal at terminal board 1113.

An block 1103 is similar to 1102 except that it uses a single input for binary generate 5–8 rather than the two inputs BG1–4 and BP5–8. It indicates a carry out of position 8 where $P \neq Q$ in Op class I and thus indicates $P>Q$.

An block 1104 provides $+Op$ block 1109 the $P>Q$ signal in response to coincidence of the enabling signal "not generate" $\overline{\text{BG1–4}}$ and $\overline{\text{BG5–8}}$ in Op class II. An block 1104 thus indicates one situation where there is no carry generate out of position 8 of the binary adder; in Op class II this means $P>Q$.

An block 1105 responds to the other situation where there is no carry out of position 8 of the binary adder, as signified by the $\overline{\text{BP5–8}}$ and the $\overline{\text{BG5–8}}$ signals in coincidence. In Op class II this indicates $P>Q$.

In summary of the effect of this part of the special function generator, blocks 1102 and 1103 respond to carry out of position 8 of the binary adder in Op class I to provide the $P>Q$ signal; blocks 1104 and 1105 respond to the absence of a carry out of the binary adder position 8 in Op class II to provide the $P>Q$ signal at terminal board 1113.

$+An$ block 1111 provides the $P=Q$ signal at terminal board 1113 in response to a full set of inputs including binary half sums 2 and 3, and the complement outputs of An blocks 1106, 1107 and 1108. An blocks 1106–1108 provide signal intermediates to An block 1111 and to Op block 1112. In all non-connective operations the "all 1's" condition of the binary half sum indicates $P=Q$.

EQUALS COMPARATOR—SEE FIGURES 9 AND 11

Binary half sum signals available in FIGURE 9 are necessary to carry propagate addition and are used in FIGURE 10. A by-product of this type of binary complement addition is that an equals comparison of the two adder inputs is immediately available by examination of the half sums, which for equals are "all 1's."

*Example*

| 9 | True P | 1001 | |
|---|---|---|---|
| −9 | Complement Q | 0110 | |
| 0 | Half sum | 1111 | All 1's—P=Q |
| | | 0001 | Carries and hot 1 |
| | Full sum | 10000 | High order carry out is ignored |

The equals comparator in the preferred embodiment involves binary adder blocks 802–807, 906, 913 which produce signals at terminal boards 810, 915 and 935.

Signals are fed to An blocks 1106–1108 in dual pairs such as $\overline{\text{P1Q1}}$ and BCG1 in such fashion that if either input of either pair is conditioned, the An block is deconditioned. The An block is conditioned by the "not" of each of its four inputs. Carry generate term BCG1 is equivalent to P1Q1; it combines with $\overline{\text{P1Q1}}$ at the AND circuit to form $\overline{\text{P⊻Q}}$. Since the complement $+n$ rather than the true $-n$ is used by the An blocks 1106–1108, the pair of inputs when conditioned $+n$ represent a 1-bit half sum. $\overline{\text{P4Q4}}$ and BCG4 represent a 1-bit half sum for position 4. An block 1106 thus responds to 1-bits in positions 1 and 4; An block 1107 to 1-bits in positions 5 and 8; An block 1108 to 1-bits in positions 6 and 7; and An block 1111 to the outputs of 1106, 1107 and 1108 together with $+p$ BHS signals for positions 2 and 3. An block 1111 thus produces the $+pP=Q$ signal when the half sum is "All 1's"; Op block 1112 produces the complement.

This is the cheapest equality comparator known where a binary adder is included in the system, since a few AND circuits (in addition to the first stage of the adder) provide the comparison. It is also the fastest known equals comparator.

GATE CONTROL—FIG. 12

The circuitry shown in FIGURE 12a and FIGURE 12b provides control for gates 110, 111 and 114 in FIGURE 1 to gate the binary sum, the trinary sum or the contents of the P register selectively to R register 113. The gate control circuit responds to the situations shown in the OPERATIONS and GATING chart, FIGURE 3.

The exact mechanics of the gate control are a straightforward derivation from FIGURE 3. During Op31, for example, it is desired to gate the output of the trinary adder to result register R 113 if there is a trinary carry out, and to gate the output of the binary adder to register R 113 if there is no trinary carry out.

The circuitry for gating the output of the trinary adder in Op31 involves An blocks 1218, 1219, 1221 and 1222, any one of which can produce a conditioning input to Op block 1226 which produces the final GATE TRINARY signal. An block 1218 responds to a TG1-4 signal coincident with a TP5-8 signal, to indicate a trinary carry generated in a low order and propagated through orders 5-8, and thereby to indicate the need for a GATE TRINARY signal. An block 1219 responds to a high order group carry generate term TG5-8 to indicate the trinary carry and operate Op block 1226. An blocks 1221 and 1222 and Op block 1227 duplicate the logic of blocks 1218, 1219 and 1226; this is an example of the possibility of duplicating logic for the sake of powering, rather than taking the additional time necessary to amplify the result signal.

The circuitry for gating the output of the binary adder in Op31 involves An blocks 1212 and 1213 and Op block 1223. An block 1212 responds to the lack of high order propagate term $\overline{(TP5-8)}$ simultaneous to the lack of a high order generate term ($\overline{(TG5-8)}$ to select the output of the binary adder. There can be no high order carry out of the trinary adder if the high order bits neither generate nor propagate a carry, regardless of the low order carries. An block 1213 responds to the $\overline{(TG5-8)}$ signal simultaneously to a $\overline{(TG1-4)}$ signal which is indicative of the lack of a carry from the low order group. There can be no high order carry out of the trinary adder if neither the high order group nor the low order group generates a carry, regardless of the high order propagate situation. In the absence of a trinary adder high order carry in modular add operations; it is proper to gate the output from the binary adder; the GATE BINARY signal performs this function. A $\overline{GATE\ SELECT}$ control input is connected to each An block 1212-1222. This provides supervisory control of data routing in the system. Other data can alternatively be routed to the same output register R.

OPERATIONS and GATING chart FIGURE 3 shows several operations (Op's 16, 17, 18, 19, 20, 21) where it may be proper to gate the contents of the P register 101 directly to the R register 113. Circuitry 1251-1257 of FIGURE 12b accomplishes this function. For example, +An block 1252 is conditioned by a GATE 8 SELECT signal and the Op (20-21) signal to respond to the P≠Q signal by producing, via +Op blocks 1256 and 1257, the GATE P signal to operate gate 114 in FIG. 1. Gate P controls for operation (18-19) is by +An block 1251 for P=Q. Controls for Op's 16 and 17 respond to binary carry out signals developed from the group carry lookahead signals (BG5-8, BP5-8, BG1-4, $\overline{BG1-4}v$, $\overline{BP5-8}$ and $\overline{BG5-8}$) from terminal board 821 in FIGURE 8.

TRINARY ADDER—FIG. 13

This figure is included as a recapitulation of trinary adder 105 of FIGURE 1. This adder includes carry save logic 1301 and a carry propagate adder 1302 in tandem. Instead of the usual carry save triggers and carry connections, the carry save logic third inputs are taken from modulus register M 103. Each carry save logic stage logical function generator thus produces, not a sum, but an oddness (logical connective) indications TPS and a majority indication TCGT. These signals are connected as inputs to the carry propagate adder 1302, which derives the final result in ordinary adder fashion during add operations. The TPS signal is connected directly; the TCGT signal is connected to the next higher order. The result is set into R register 113.

During logical connective operations, the trinary adder logical function generator serves to produce the logical connective specified by the bits of the OP code, as explained under subhead "LOGICAL CONNECTIVE OPERATION—FIG. 4" supra. The logical connective signals pass via connective parity generator 109 to F register 112 for further processing.

CONNECTIVE PARITY GENERATOR FIG. 14

Since parity generation has become a standard function, the parity circuits are shown only in representative circuits. The Trinary Adder Logical Function Generator produces an eight-bit logical connective byte. This logical connective byte is provided with a ninth bit which augments the number of 1-valued bits in the logical connective byte so that the total number of 1-valued bits in the nine is odd. The logical connective parity generator thus provides the logical connective byte with odd parity.

The inputs to the connective parity generator are the TPS signals from the trinary logical function generator, in final form as logical connectives. The total number of 1-valued bits in the eight-bit logical connective byte can be either odd or even—there is no straightforward way of predicting this parity from the inputs so a new parity bit is produced. The parity production is by a tree of AND and OR circuits feeding other AND and OR circuits.

Dotted block 1401 contains An blocks 1402–1405 and Op block 1407, and produces an intermediate parity signal ($a$ or $\bar{a}$) at terminal board 1408 depending upon the parity of bit positions 1, 2 and 3. Similar circuits, not shown, produce other intermediate parity signals ($b$ $\bar{b}$, $c$, $\bar{c}$) depending upon the parity of bit positions 4, 5, 6 for $b$ and 7, 8 for $c$.

The intermediate parity signals are combined by An blocks 1418–1421 and Op block 1422 to provide the logical connective byte parity signal KB at terminal board 1410. Op block 1422 also responds to a direct P>Q input from terminal board 1113. Signal KB is thus available during appropriate operations as a parity bit, and during other operations as a signal indicating P>Q. It may also be forced under program control. The inferences to be drawn from the meaning attached to the KB signal are not a part of this patent application.

Circuit blocks 1411, 1412, 1413, 1414 and 1417 cooperate to produce a signal LB which depending upon the operation has significance "all zeros" or "P=Q." For logical connective operations, the significance is "all zeros." Bit positions 1–4 connect to Op block 1411; bit positions 5–8 connect to Op block 1412. If bits 1–4 are all zeros, there is no conditioning of Op block 1411 and the output of block 1411 is $-p$. During logical connective operations 0–15 the top input to $-Ap$ block 1413 is conditioned and its output flows through to terminal board 1410 via blocks 1414 and 1417. The LB signal thus signifies the "all zeros" condition of the carry save adder section (logical function generator) of the trinary adder.

The presence of the $\overline{Suppress}$ signal is merely indicative of the need for operation control on an on-off basis. If the operation is not suppressed, it occurs throughout the logic. Certain other circuits within the logic unit are responsive to the $\overline{Suppress}$ signal wherever inhibition may be required.

While the invention has been particularly shown and described with reference to a preferred embodiment thereof, it will be understood by those skilled in the art that various changes in form and details may be made therein without departing from the spirit and scope of the invention.

What is claimed is:

1. A device for performing variable radix addition comprising:
   (a) first input means for specifying in binary representation a multi-bit operand P;
   (b) second input means for specifying in binary representation a multi-bit operand Q;
   (c) third input means for specifying the binary equivalent of a selected radix M;
   (d) first addition means for providing in binary representation the full binary sum of the operands P and Q, together with an indication of the presence or absence of a high order carry out;
   (e) second addition means for providing in binary representation, the full result of the arithmetic operation $P+Q-M$, together with an indication of the presence or absence of a high order carry out;
   (f) gate control means responsive to the indication of the presence or absence of the high order carry out from said second addition means for producing associated gate control signals; and
   (g) gating means responsive to said gate control means for selectively gating out the full sum produced by the first addition means or the full result produced by the second addition means.

2. A device for performing variable radix addition comprising:
   (a) first input means for specifying in binary representation a multi-bit operand P;
   (b) second input means for specifying in binary representation a multi-bit operand Q;
   (c) third input means for specifying the binary equivalent of a selected radix M;
   (d) first addition means for providing in binary representation the full binary sum of the operands P and Q, together with an indication of the presence or absence of a high order carry out;
   (e) second addition means for providing in binary representation, the full result of the arithmetic operation $P+Q-M$, together with an indication of the presence or absence of a high order carry out;
   (f) gate control means responsive to the indication of the presence of a high order carry out from said second addition means for producing a first gate control signal and responsive to the indication of the absence of a high order carry out from said second addition means for producing a second gate control signal; and
   (g) gating means responsive to said first gate control signal for gating out the full result produced by the second addition means and responsive to said second gate control signal for gating out the full sum produced by the first addition means.

3. A device for performing variable radix subtraction comprising:
   (a) first input means for specifying in binary representation a multi-bit operand P;
   (b) second input means for specifying in binary representation a multi-bit operand Q;
   (c) third input means for specifying the binary equivalent of a selected radix M;
   (d) first addition means for providing in binary representation the full binary difference between the operands P and Q together with an indication of the presence or absence of a high order borrow;
   (e) second addition means for providing in binary representation, the full binary result of the arithmetic operation consisting of differencing P and Q and adding M, together with an indication of the presence or absence of a high order borrow;
   (f) gate control means responsive to the indication of the presence or absence of the high order borrow from said first addition means for producing associated gate control signals; and
   (g) gating means responsive to said gate control means for selectively gating out the full result produced by the first addition means or the full result produced by the second addition means.

4. Means for logically combining multi-bit operands comprising:
   (a) first input means for specifying a multi-bit binary representation of a first operand P;
   (b) second input means for specifying a multi-bit binary representation of a second operand Q;
   (c) third input means for specifying a multi-bit binary equivalent of a radix M;
   (d) first binary arithmetic means controllable for performing in binary each of the operations $P+Q$, $P-Q$ and $Q-P$, and for providing for each operation, a full binary result together with an indication of whether the operation produced a high order carry out or borrow;
   (e) second binary arithmetic means controllable for performing in binary each of the operations $$P+Q-M, P-Q+M \text{ and } Q-P+M$$

and for providing for each operation a full binary result together with an indication of whether the operation produced a high order carry out or borrow;
   (f) program control means for specifying an arithmetic operation to be performed with operands P, Q and M and for controlling said first and second arithmetic means to perform selected operations contemporaneously;
   (g) gate control means responsive to the specification of said program control means and the carry out or borrow indications from said first and second arithmetic means for producing patterns of gate control signals which are unique to the specification of the program control means and the carry or borrow indications; and
   (h) gating means responsive to said gate control means for selectively gating to a utilization device the full result produced by either of said first or second arithmetic means or either of the operands P and Q.

5. A logical unit according to claim 4 wherein said first binary arithmetic means includes means to produce half sum signals, and wherein means for indicating equality of operands P and Q are provided, said last named means comprising coincidence means responsive to said half sum signals for providing a coincidence signal indicating equality of said operands P and Q.

6. A variable logic function producing device comprising:
   (a) means for specifying a first multi-bit binary operand P and its complement $\overline{P}$;
   (b) means for specifying a second multi-bit binary operand Q and its complement $\overline{Q}$;
   (c) means for specifying a third multi-bit binary operand M and its complement $\overline{M}$;
   (d) program control means for supplying control signals representative of a selected operation to be performed;
   (e) input gating means responsive to said control signals for rendering predetermined ones of said P, $\overline{P}$, Q, $\overline{Q}$, M and $\overline{M}$ signals available from said specifying means (a), (b) and (c);
   (f) first binary arithmetic means responsive to said control signals for performing predetermined arithmetic operations with the predetermined signals available from the first and second operand specifying means and for producing outputs representing the results of said operations;
   (g) second binary arithmetic means responsive to said control means for performing predetermined arithmetic operations with the predetermined signals rendered available from said first, second and third operand specifying means and for producing outputs representing the results of said operations;

(h) output gating means responsive to said control signals and to predetermined outputs of said first and second arithmetic means for selectively gating the results produced by the first and second arithmetic means to a utilization device.

7. Arithmetic means for arithmetically combining three multi-order operands P, Q and M, comprising:
(a) first, second and third input means for specifying in binary representation the operands P, Q and M, said input means including means for supplying for each order $n$ of the operands signals $Pn$, $Qn$, and $Mn$ if the binary value of that order is one, and signals $\overline{P}n$, $\overline{Q}n$ and $\overline{M}n$ if the binary value of that order is zero;
(b) a logical function generator for combining within each order $n$, signals $\overline{P}n\ \overline{Q}n\ Mn$, $Pn\ Qn\ Mn$, $\overline{P}n\ Qn\ \overline{M}n$ and $Pn\ \overline{Q}n\ \overline{M}n$ each by AND logic function to produce for each order $n$ and oddness signal when an odd number of binary ones are present in that order, and for combining signals $Pn$, $Qn$, $Pn\ Mn$, and $Qn\ Mn$ each by the AND logic function to produce for each order $n$ a majority signal when at least two binary ones are present in that order;
(c) binary arithmetic means responsive to the oddness and majority signals from the several orders for producing a multi-order output representing full binary result of an arithmetic operation involving the operands P, Q and M.

8. The invention defined in claim 7 wherein the binary arithmetic means is controllable to perform each of the operations $P+Q-M$, $P-Q+M$ and $Q-P+M$; and wherein there is included a program control means for specifying the operation to be performed and for controlling the binary arithmetic means to perform said specified operation.

9. The invention defined in claim 7 wherein said logical function generator within each order $n$ includes a first logical AND circuit responsive to inputs $\overline{P}n\ \overline{Q}n\ Mn$, a second logical AND circuit responsive to inputs $Pn\ Qn\ Mn$, a third logical AND circuit responsive to inputs $\overline{P}n\ Qn\ \overline{M}n$, a fourth logical AND circuit responsive to inputs $Pn\ \overline{Q}n\ \overline{M}n$ and a first logical OR circuit responsive to the outputs of said first, second, third and fourth logical AND circuits to produce said oddness signal for the associated order $n$, and having a fifth logical AND circuit responsive to inputs $Pn\ Qn$, a sixth logical AND circuit responsive to inputs $Qn\ Mn$, a seventh logical AND circuit responsive to inputs $Pn\ Mn$, and a second logical OR circuit responsive to the outputs of said fifth, sixth and seventh logical AND circuits to produce said majority signal for said associated order $n$.

10. The invention defined in claim 7 including program means for specifying logical connectives of operands P and Q, control means responsive to said specifications for enabling selected ones of said AND logic function combinations of said function generator to develop said logical connectives, and output means for transmitting said developed logical connectives.

References Cited by the Examiner

UNITED STATES PATENTS 2,954,168  9/1960  Maddox _____ 235—177 XR

MALCOLM A. MORRISON, *Primary Examiner.*